US012570480B2

(12) United States Patent
Yamaguchi

(10) Patent No.: US 12,570,480 B2
(45) Date of Patent: Mar. 10, 2026

(54) CONVEYANCE PATH SWITCHING APPARATUS, CONVEYANCE SYSTEM, AND CONVEYANCE PATH SWITCHING METHOD

(71) Applicant: YAMAHA HATSUDOKI KABUSHIKI KAISHA, Iwata (JP)

(72) Inventor: Kota Yamaguchi, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 124 days.

(21) Appl. No.: 18/730,119

(22) PCT Filed: Feb. 25, 2022

(86) PCT No.: PCT/JP2022/007997
§ 371 (c)(1),
(2) Date: Jul. 18, 2024

(87) PCT Pub. No.: WO2023/162165
PCT Pub. Date: Aug. 31, 2023

(65) Prior Publication Data
US 2025/0145384 A1     May 8, 2025

(51) Int. Cl.
*B65G 47/64*     (2006.01)
*B65G 47/52*     (2006.01)
(Continued)

(52) U.S. Cl.
CPC .............. *B65G 47/52* (2013.01); *B65G 47/74* (2013.01); *B65G 54/02* (2013.01); *H02P 25/06* (2013.01)

(58) Field of Classification Search
None
See application file for complete search history.

(56) References Cited

U.S. PATENT DOCUMENTS 5,825,104 A * 10/1998 Kondo ................... H02K 41/03
                                                    310/12.24
6,734,583 B2 * 5/2004 Fujisawa .............. H02K 41/031
                                                    310/12.27
(Continued)

FOREIGN PATENT DOCUMENTS

CN          101081659 A * 12/2007 ............. B65G 37/02
CN          112009965 A * 12/2020 ............. B65G 47/80
(Continued)

OTHER PUBLICATIONS

International Search Report issued in PCT/JP2022/007997; mailed May 17, 2022.

*Primary Examiner* — Gene O Crawford
*Assistant Examiner* — Muhammad Awais
(74) *Attorney, Agent, or Firm* — Studebaker Brackett PLLC

(57)          ABSTRACT

A support mechanism which permits the displacement of an end surface of a movable linear conveyor toward a side in the X direction. The support mechanism supports the end portion of the movable linear conveyor with respect to the end portion of the fixed linear conveyor while having the interval between the end surface of the movable linear conveyor positioned at the facing position or the facing position and the end surface of the fixed linear conveyor in the X direction. Thus, since the interval is between the end surface of the movable linear conveyor and the end surface of the fixed linear conveyor by the support mechanism supporting the movable linear conveyor with respect to the fixed linear conveyor, it is possible to reliably form the interval therebetween. Therefore, it is possible to absorb the displacement of the released end surface.

20 Claims, 16 Drawing Sheets

(51) Int. Cl.
    *B65G 47/74*        (2006.01)
    *B65G 54/02*        (2006.01)
    *H02P 25/06*       (2016.01)

(56)             References Cited

U.S. PATENT DOCUMENTS

| | | | | |
|---|---|---|---|---|
| 8,134,258 | B2 * | 3/2012 | Finkbeiner | F16C 29/008 |
| | | | | 310/12.31 |
| 8,497,643 | B2 * | 7/2013 | Takagi | H02K 41/03 |
| | | | | 318/135 |
| 9,757,797 | B2 * | 9/2017 | Urata | H02K 41/031 |
| 2008/0029238 | A1 * | 2/2008 | Hunter | B22D 33/00 |
| | | | | 164/324 |
| 2011/0198947 | A1 * | 8/2011 | Lin | H02K 41/02 |
| | | | | 310/12.33 |
| 2013/0259628 | A1 * | 10/2013 | Hirasawa | H01L 21/6773 |
| | | | | 414/754 |
| 2019/0131860 | A1 * | 5/2019 | Suzuki | B23Q 7/14 |
| 2019/0190366 | A1 * | 6/2019 | Urata | H02K 41/03 |
| 2021/0061577 | A1 * | 3/2021 | Okazaki | B23Q 7/1447 |

FOREIGN PATENT DOCUMENTS

| | | | | | |
|---|---|---|---|---|---|
| CN | 112408001 | A | * | 2/2021 | B65G 43/08 |
| JP | 2013213550 | A | * | 10/2013 | |
| JP | WO2018/055709 | A1 | | 2/2019 | |
| JP | 2019-083597 | A | | 5/2019 | |
| JP | 2019103225 | A | * | 6/2019 | |
| WO | WO-2021124439 | A1 | * | 6/2021 | H02K 41/031 |
| WO | WO-2021229781 | A1 | * | 11/2021 | H02K 41/02 |
| WO | WO-2021229782 | A1 | * | 11/2021 | H02K 41/02 |

\* cited by examiner

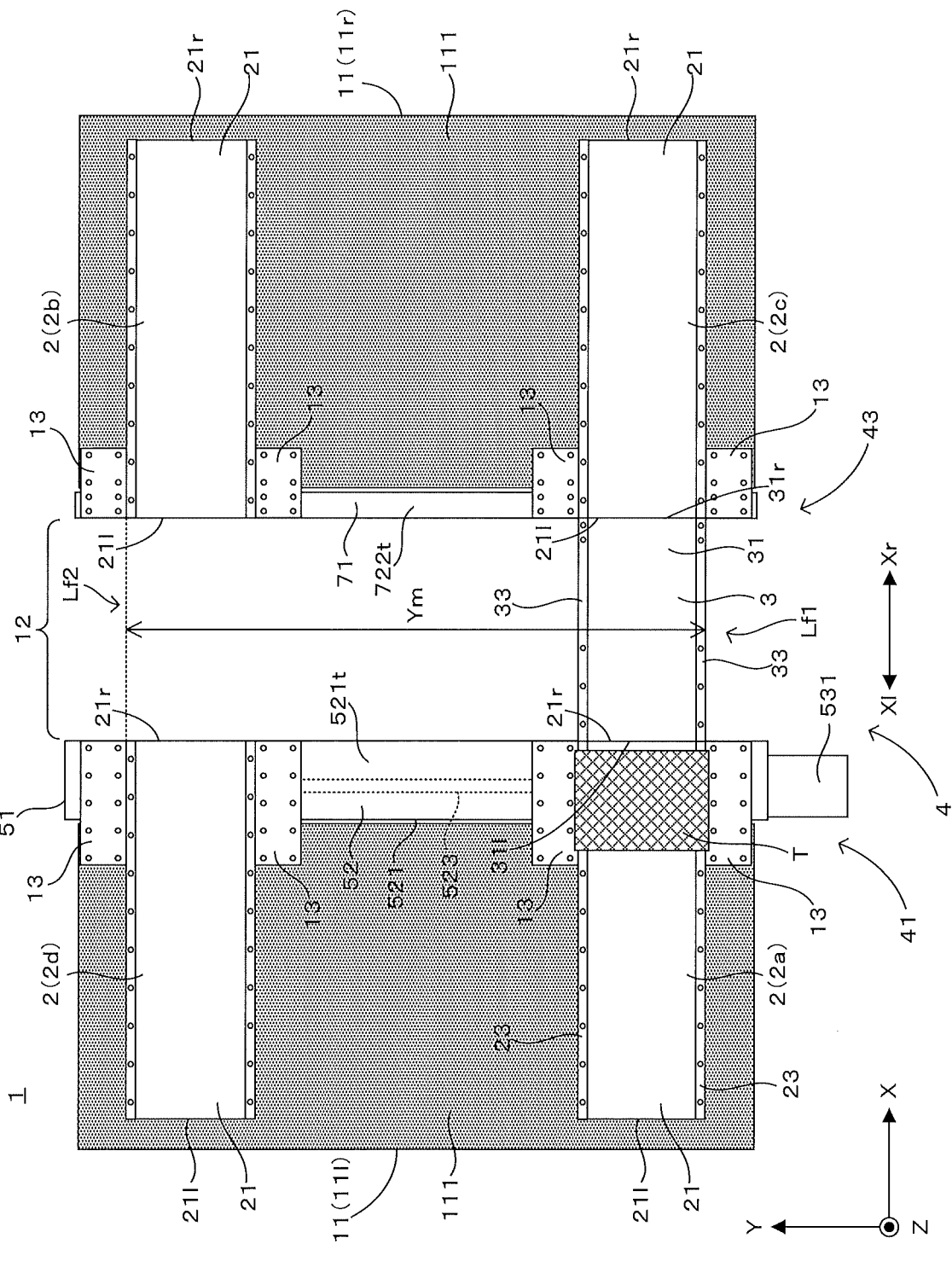
F I G.  1 A

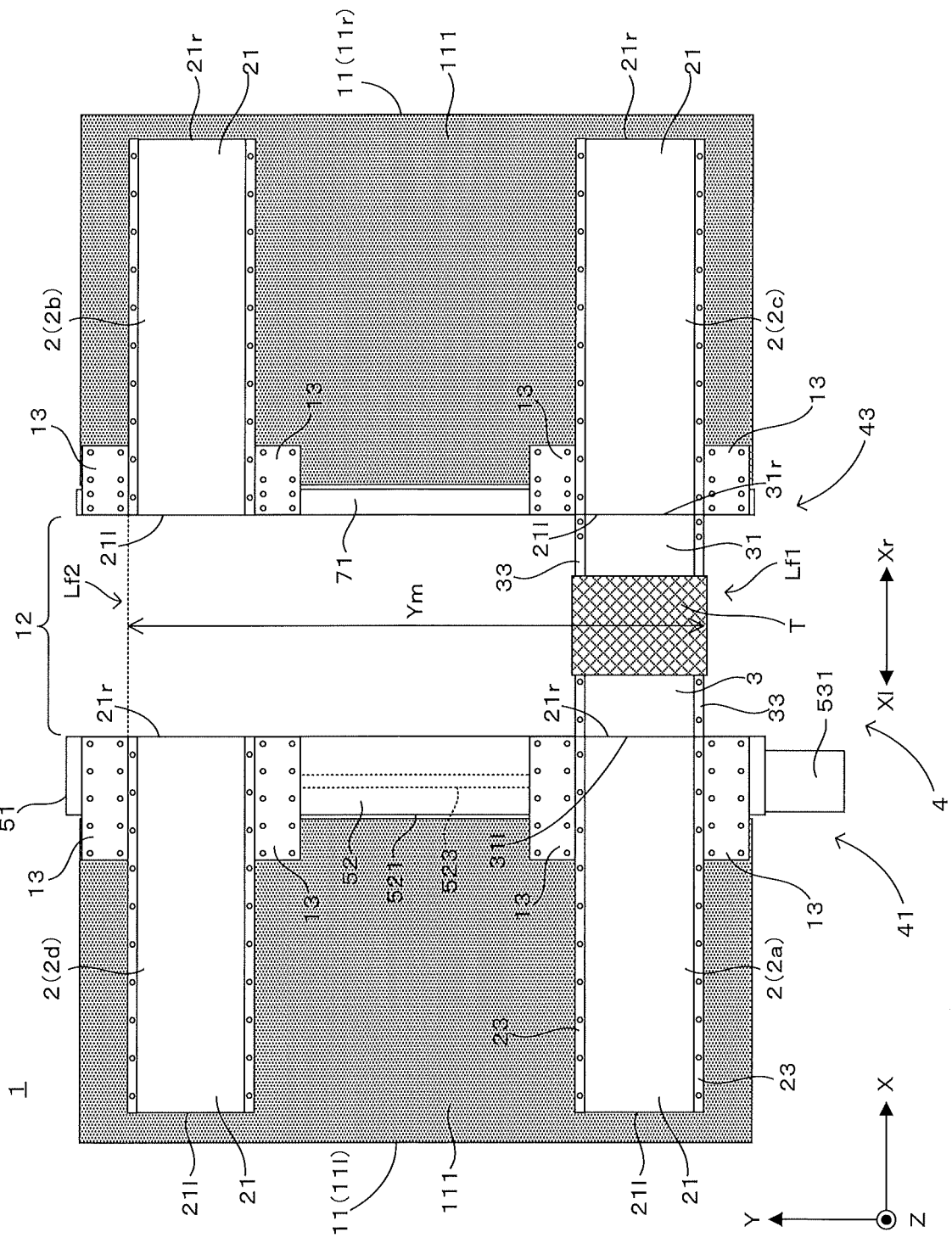
F I G. 1B

F I G. 1 D
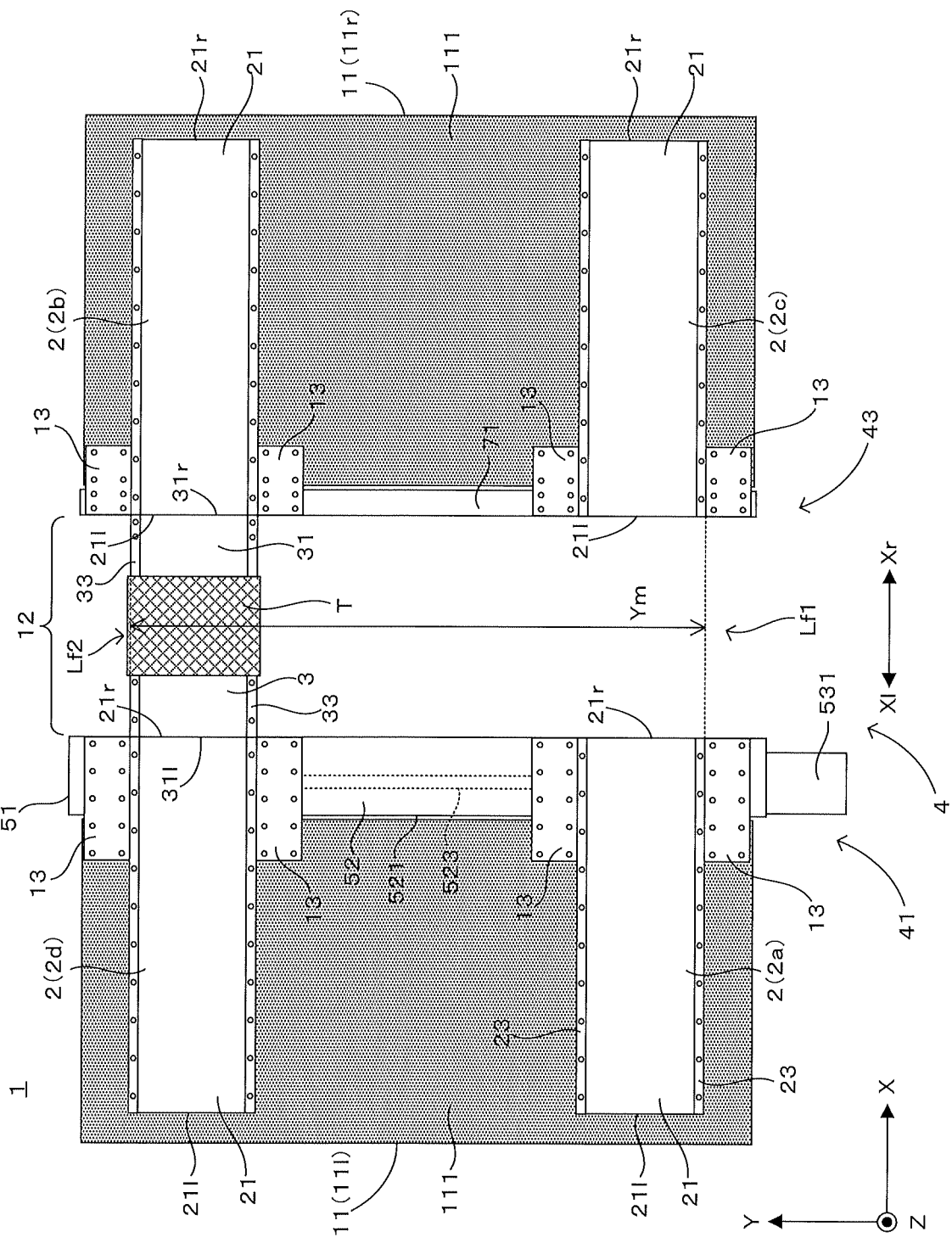

F I G.  1 E
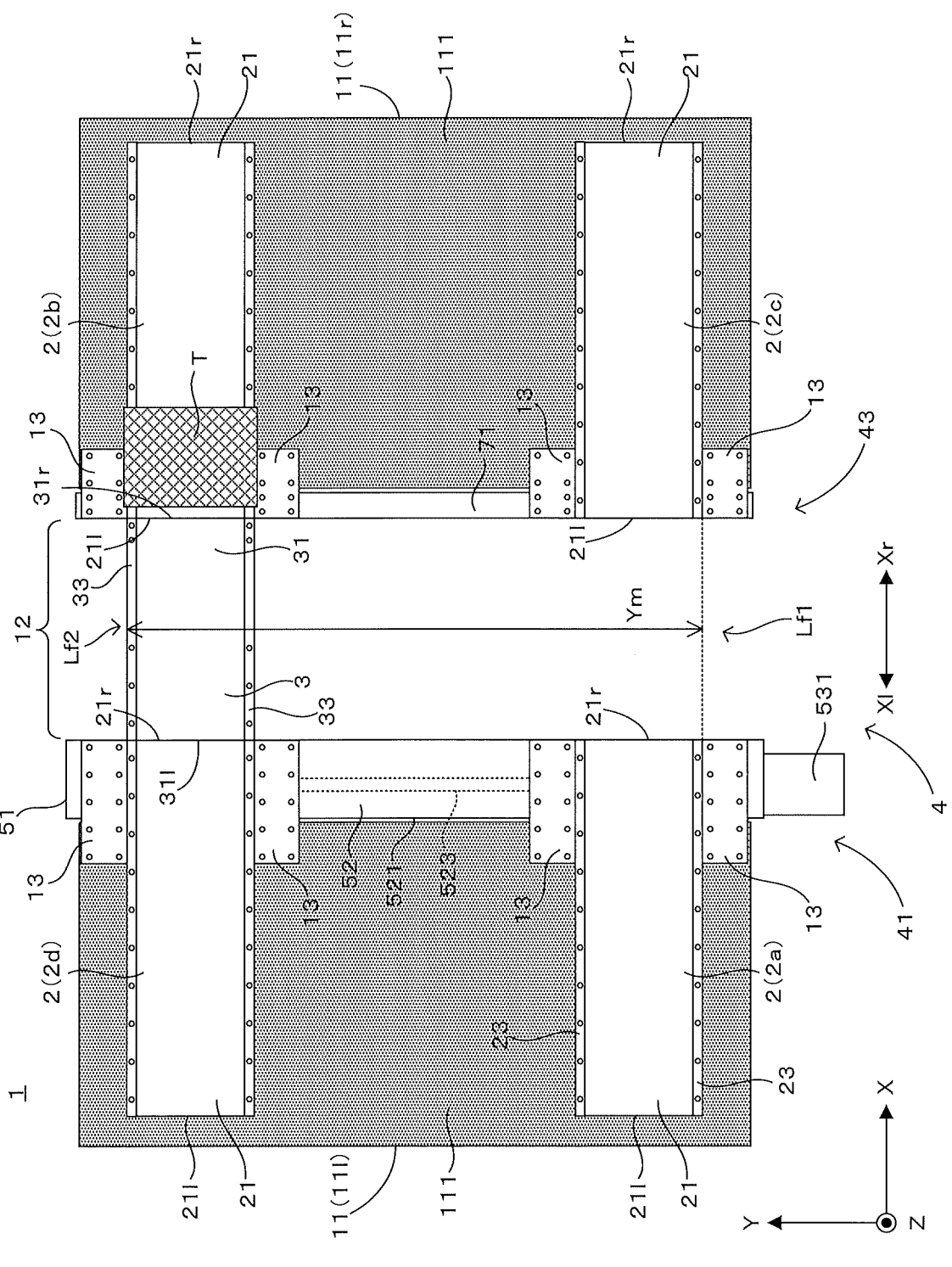

F I G. 5
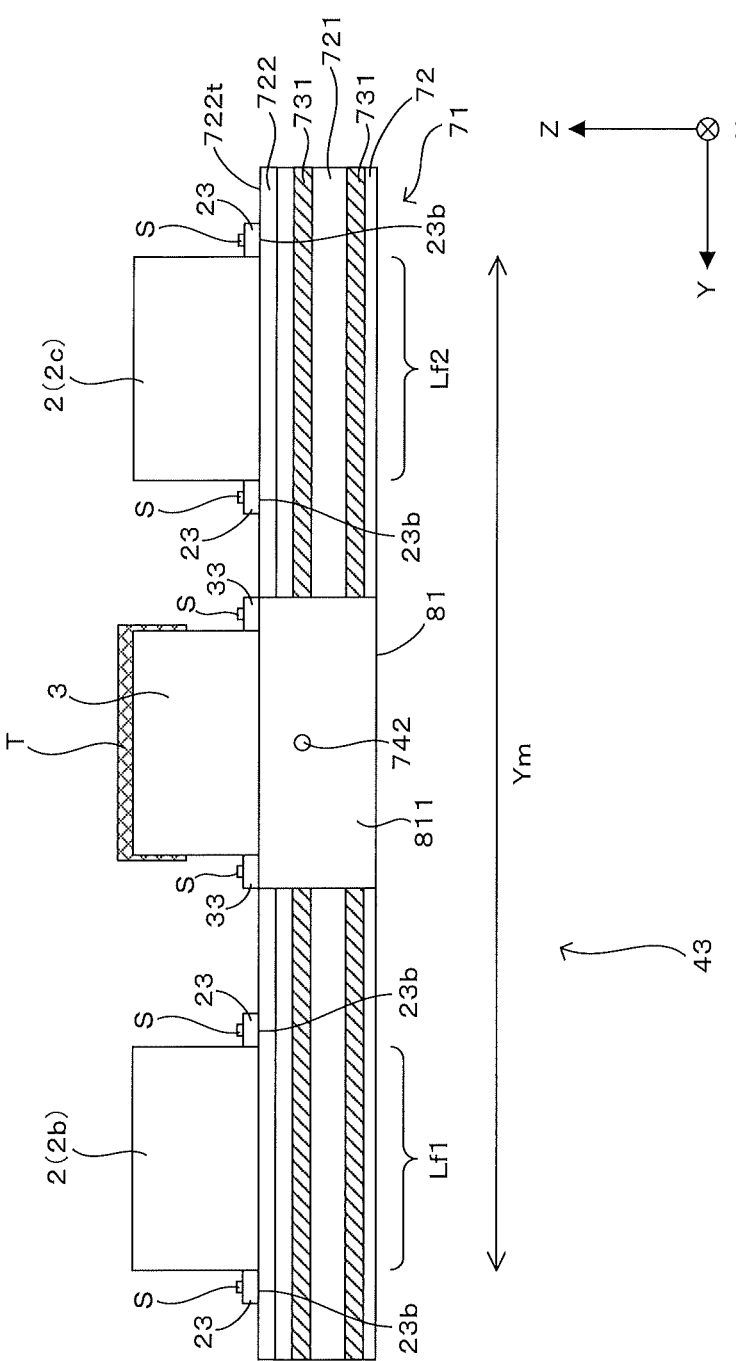

F I G.  6
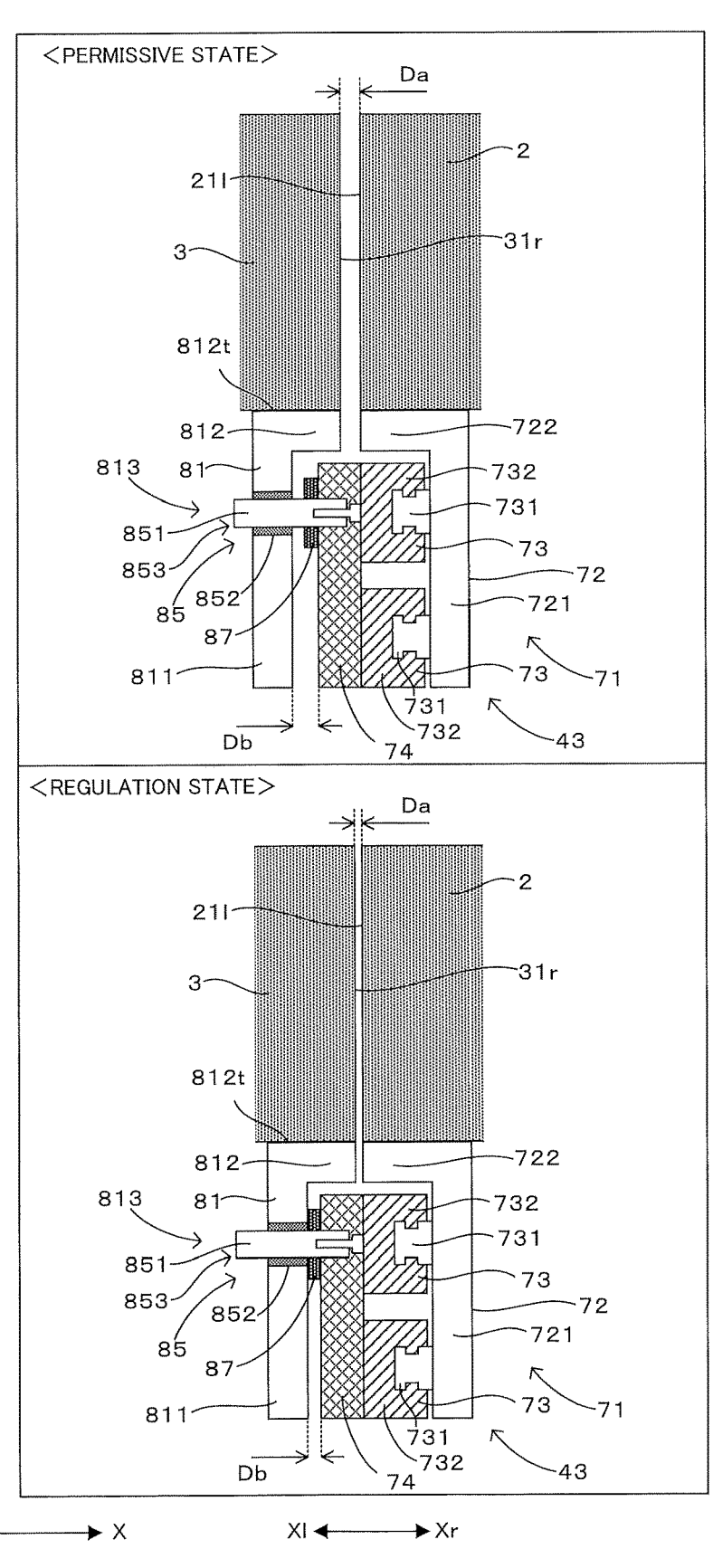

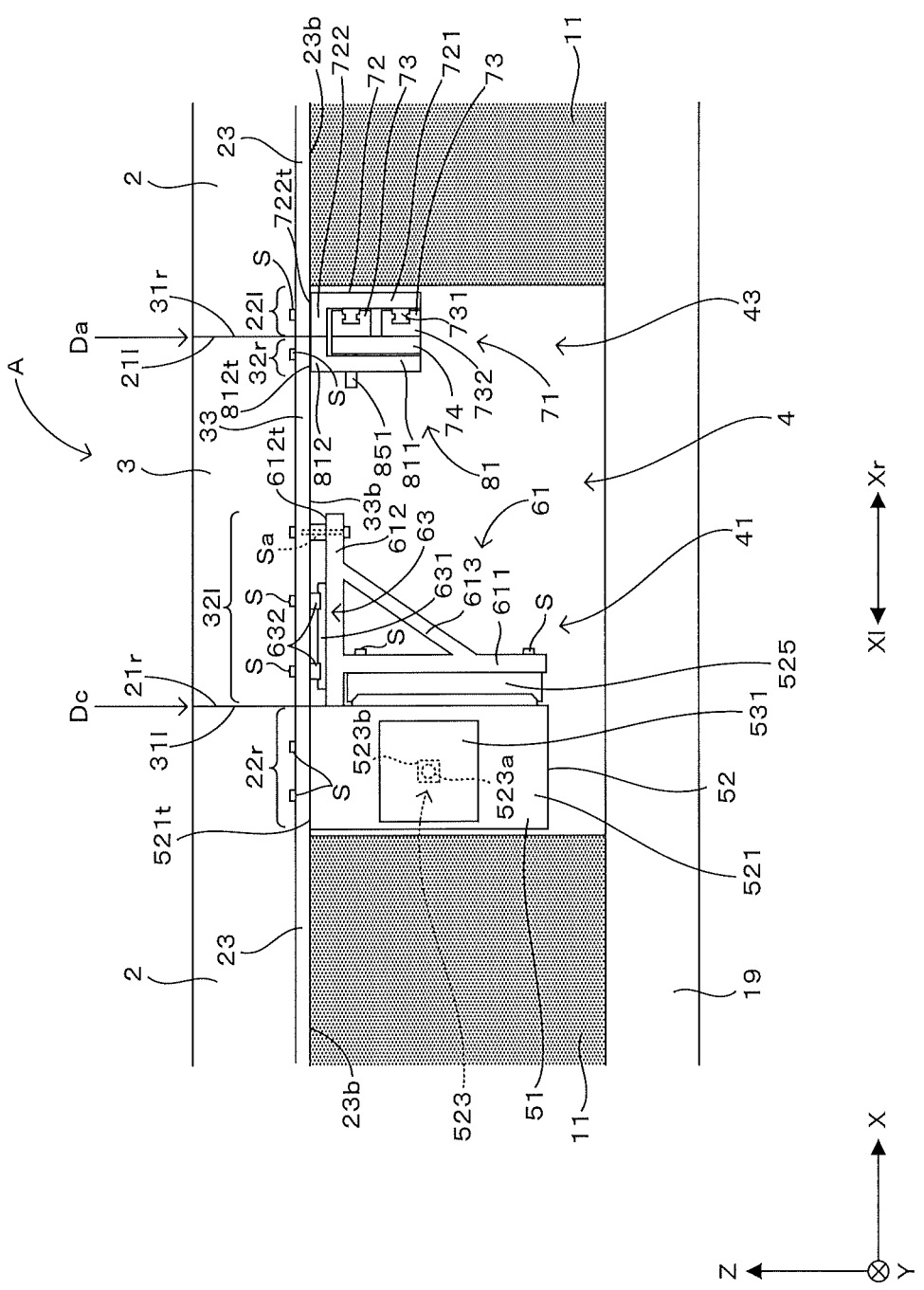
F I G. 7

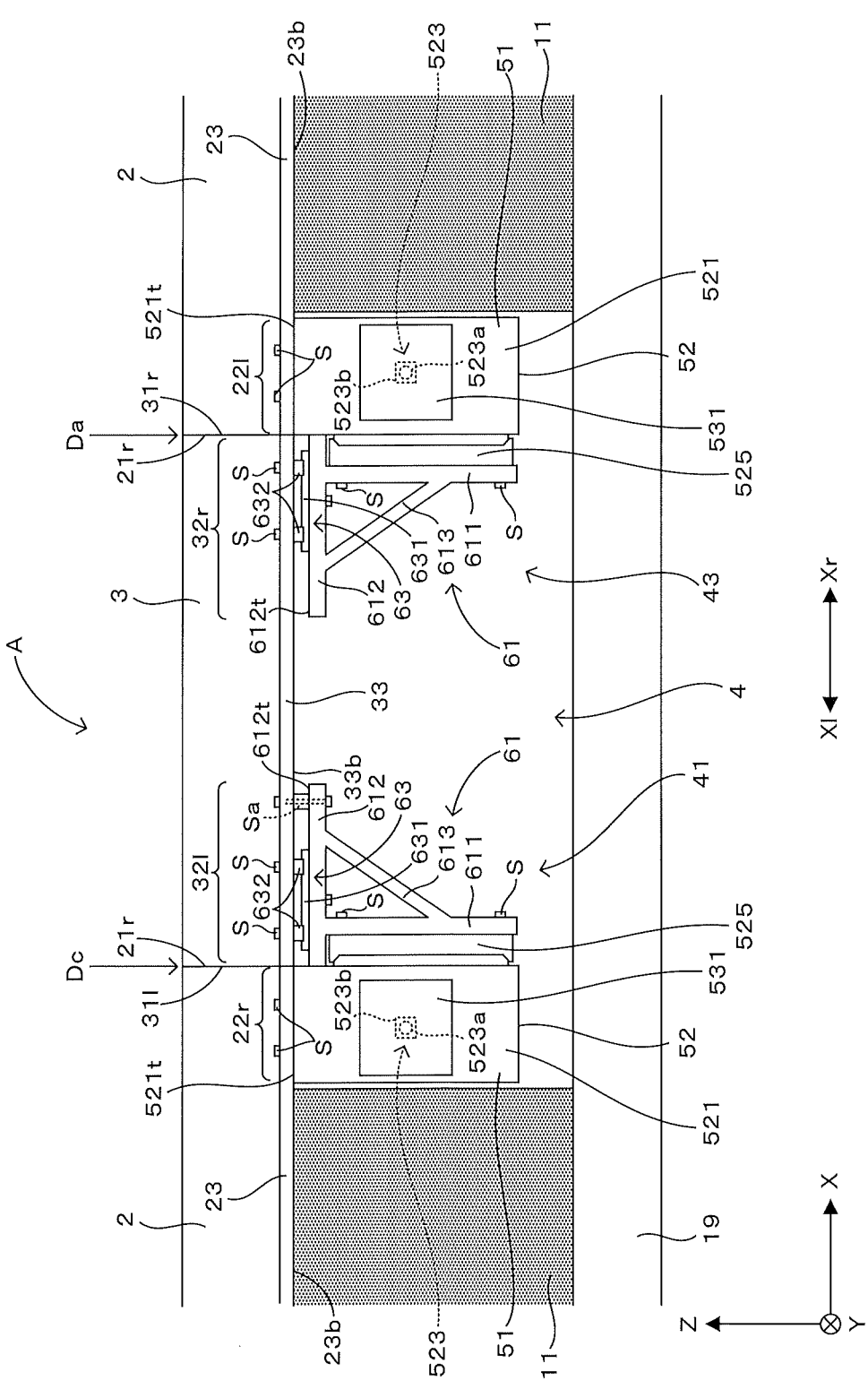
F I G. 8

F I G .  9
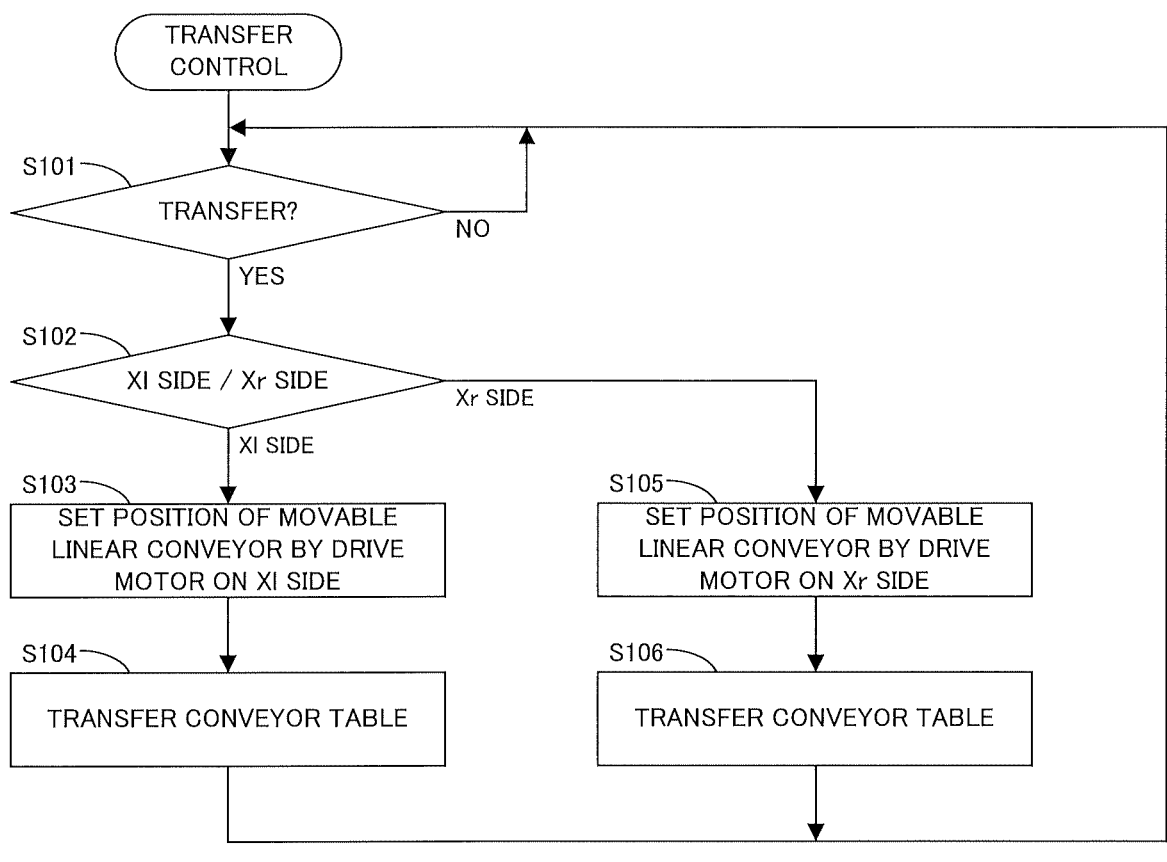

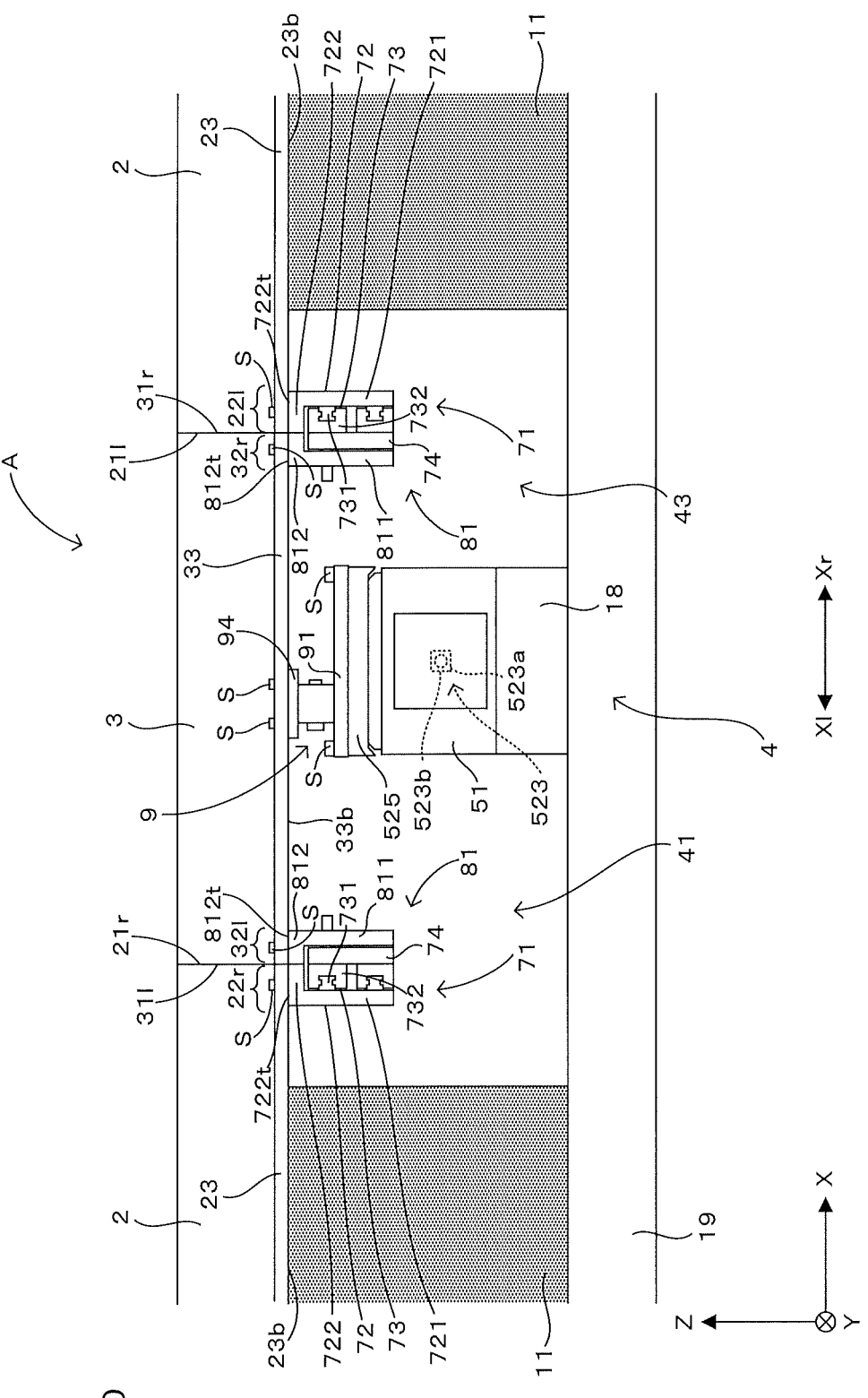
F I G. 1 0

F I G.   1 1
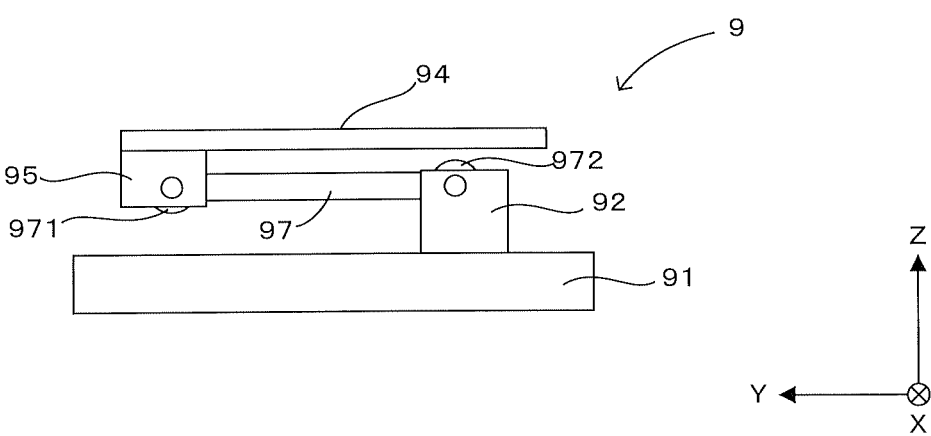

F I G. 1 2
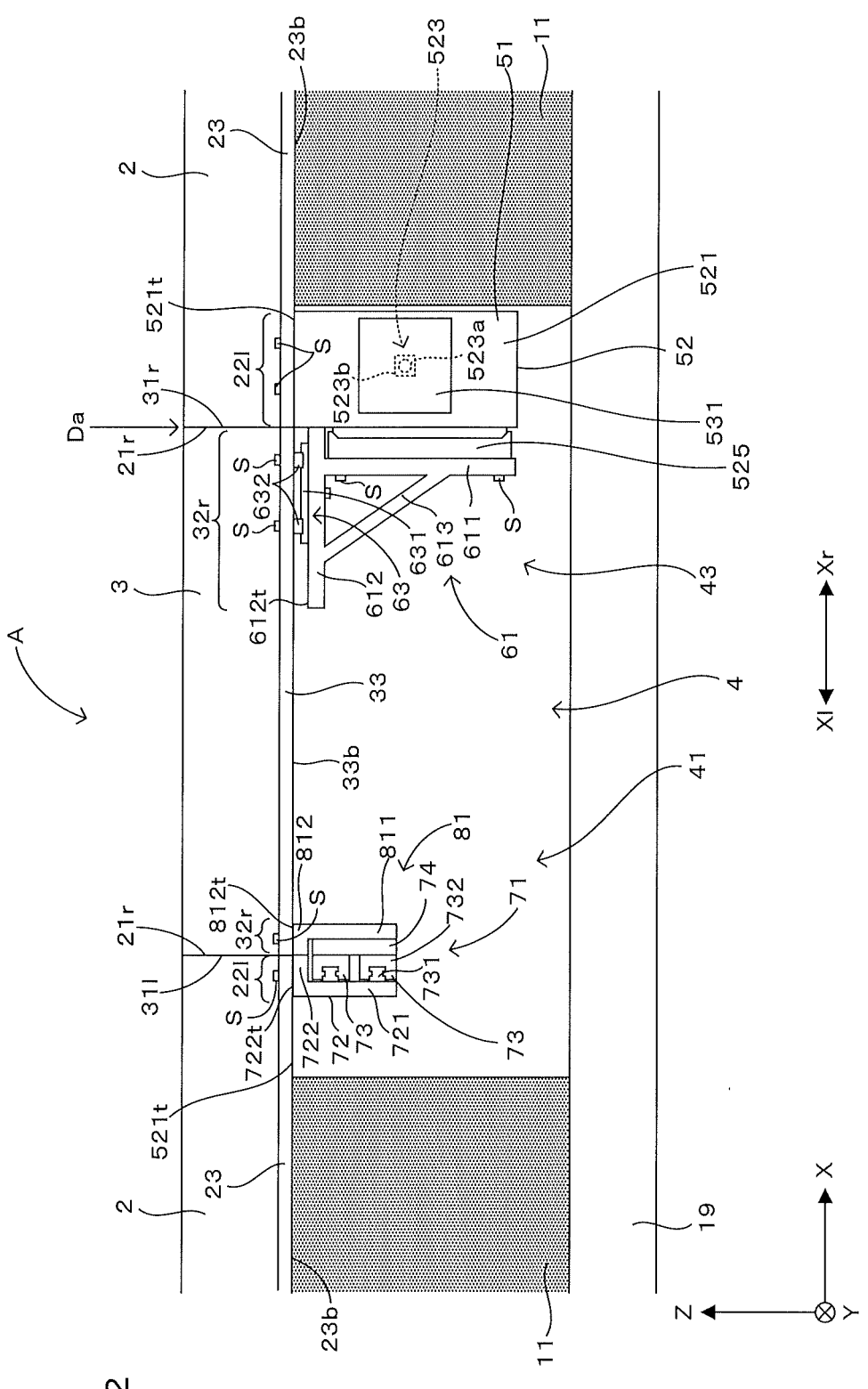

CONVEYANCE PATH SWITCHING APPARATUS, CONVEYANCE SYSTEM, AND CONVEYANCE PATH SWITCHING METHOD

CROSS-REFERENCE TO RELATED APPLICATION

This application is a National Stage of International Patent Application No. PCT/JP2022/007997, filed Feb. 25, 2022, the entire contents of which is incorporated herein by reference.

BACKGROUND

Technical Field

This disclosure relates to a technique for performing switching of a conveyance path of a table conveyor between two fixed linear conveyors arranged on both sides of a movable linear conveyor, by the movable linear conveyor.

Background Art

WO 2021/229781 discloses a circulation conveyance apparatus for circularly conveying a table conveyor by using a movable linear conveyor which conveys the table conveyor between two fixed linear conveyors arranged in parallel. In the circulation conveyance apparatus, the movable linear conveyor is movable between a position facing one of the two fixed linear conveyors and a position facing the other fixed linear conveyor. This movable linear conveyor transfers the table conveyor to/from the one fixed linear conveyor at the position facing the one fixed linear conveyor and transfers the table conveyor to/from the other fixed linear conveyor at the position facing the other fixed linear conveyor.

Further, in such a linear conveyor, for example, as shown in Japanese Patent Application Laid Open Gazette No. 2019-083597, deformation can occur, accompanying heat generation. Particularly, in the fixed linear conveyor mounted on a mounting frame as shown in WO 2021/229781, since elongation and contraction in a longitudinal direction is restrained, there is a case where a warp occurs, accompanying the heat generation. Then, in WO 2021/229781, for supporting a frame of the fixed linear conveyor to the mounting frame, the warp of the frame accompanying the heat generation is suppressed by fixing one end of the frame to the mounting frame and not fixing the other end of the frame to the mounting frame.

SUMMARY

Such thermal deformation as described above can occur also in the movable linear conveyor. Then, in a configuration to switch a conveyance path between the fixed linear conveyors arranged on both sides of the movable linear conveyor, the thermal deformation of the movable linear conveyor has been difficult to deal with. In other words, for switching the conveyance path between one-side fixed linear conveyor and the other-side fixed linear conveyor, the movable linear conveyor arranged between these fixed linear conveyors is used. In such a case, for transferring a conveyor table to/from the one-side fixed linear conveyor, one end of the movable linear conveyor faces the one-side fixed linear conveyor, and for transferring the conveyor table to/from the other-side fixed linear conveyor, the other end of the movable linear conveyor faces the other-side fixed linear conveyor. Therefore, for example, as described above, even if one end of both the ends of the movable linear conveyor is released, when the one end and the fixed linear conveyor facing the one end come into contact with each other, accompanying the thermal deformation of the movable linear conveyor, the movable linear conveyor warps.

Accordingly, the embodiments of the present disclosure make it possible to avoid a movable linear conveyor and a fixed linear conveyor adjacent to the movable linear conveyor from coming into contact with each other due to thermal deformation of the movable linear conveyor and thereby suppress occurrence of a warp of the movable linear conveyor.

A conveyance path switching apparatus according to the disclosure, comprises a movable linear conveyor conveying a conveyor table in a predetermined conveyance direction; and a conveyor moving unit moving the movable linear conveyor between a first position and a second position which are different from each other in a switching direction inclined with respect to the conveyance direction. A first fixed linear conveyor faces the first position from one side of the conveyance direction, and a second fixed linear conveyor faces the second position from other side of the conveyance direction opposite to the one side. The movable linear conveyor transfers the conveyor table to/from the first fixed linear conveyor while stopping at the first position, and the movable linear conveyor transfers the conveyor table to/from the second fixed linear conveyor while stopping at the second position. The conveyor moving unit has an other-side support mechanism which supports the movable linear conveyor with respect to the second fixed linear conveyor while having an interval between the other end which is an end on the other side of the movable linear conveyor which is positioned at the second position and the second fixed linear conveyor in the conveyance direction, and the other-side support mechanism permits displacement of the other end of the movable linear conveyor toward the other side in the conveyance direction.

A conveyance system according to the disclosure, comprises a first fixed linear conveyor driving a conveyor table in a conveyance direction; a second fixed linear conveyor driving the conveyor table in the conveyance direction; and a conveyance path switching apparatus described above which is arranged between the first fixed linear conveyor and the second fixed linear conveyor in the conveyance direction.

A conveyance path switching method according to the disclosure, comprises moving a movable linear conveyor conveying a conveyor table in a predetermined conveyance direction, between a first position and a second position which are different from each other in a switching direction inclined with respect to the conveyance direction, by a conveyor moving unit. A first fixed linear conveyor faces the first position from one side of the conveyance direction, and a second fixed linear conveyor faces the second position from the other side of the conveyance direction opposite to the one side. The movable linear conveyor transfers the conveyor table to/from the first fixed linear conveyor while stopping at the first position, and the movable linear conveyor transfers the conveyor table to/from the second fixed linear conveyor while stopping at the second position. The conveyor moving unit has an other-side support mechanism supporting the movable linear conveyor with respect to the second fixed linear conveyor while having an interval between the other end which is an end on the other side of the movable linear conveyor which is positioned at the second position and the second fixed linear conveyor in the conveyance direction, and the other-side support mechanism permits displacement of the other end of the movable linear conveyor toward the other side in the conveyance direction.

In the present disclosure (the conveyance path switching apparatus, the conveyance system, and the conveyance path switching method) having such a configuration, provided is the other-side support mechanism which permits displacement of the other end of the movable linear conveyor toward the other side in the conveyance direction, and in other words, the other end of the movable linear conveyor is released. Particularly, this other-side support mechanism supports the movable linear conveyor with respect to the second fixed linear conveyor while having an interval between the other end of the movable linear conveyor which is positioned at the second position and the second fixed linear conveyor in the conveyance direction. Thus, by providing the interval between the other end of the movable linear conveyor and the second fixed linear conveyor by the other-side support mechanism supporting the movable linear conveyor with respect to the second fixed linear conveyor, it is possible to reliably form the interval therebetween. Therefore, the displacement of the other end which is released can be absorbed by this interval, and it is thereby possible to avoid contact between the other end of the movable linear conveyor and the second fixed linear conveyor. Thus, it becomes possible to avoid the movable linear conveyor and the fixed linear conveyor adjacent to the movable linear conveyor from coming into contact with each other due to thermal deformation of the movable linear conveyor and thereby suppress occurrence of a warp of the movable linear conveyor.

The conveyance path switching apparatus may be configured so that the other-side support mechanism has a movable member attached to the movable linear conveyor, a guide part attached to the second fixed linear conveyor, a guided member guided in the switching direction by the guide part, and an other-side support part supporting the movable member with respect to the guided member, and the other-side support part permits the movable member to move toward the other side with respect to the guided member in the conveyance direction and restrains the movable member with respect to the guided member in the switching direction. In such a configuration, the movable member is mounted on the movable linear conveyor and this movable member is supported with respect to the guided member guided in the switching direction by the other-side support part. Since this other-side support part restrains the movable member with respect to the guided member in the switching direction, when the guided member is guided in the switching direction, the movable member is moved, accompanying the guided member, and the movable linear conveyor is moved, accompanying the movable member. Thus, it is possible to appropriately guide the movable linear conveyor in the switching direction. Further, since the other-side support part permits the movable member to move toward the other side with respect to the guided member in the conveyance direction, the movable member can be moved toward the other side, accompanying the thermal deformation of the movable linear conveyor, and the displacement of the other end of the movable linear conveyor is not hindered. As a result, it becomes possible to perform both the functions of guiding the movable linear conveyor in the switching direction and suppressing the warp of the movable linear conveyor.

The conveyance path switching apparatus may be configured so that the other-side support part has a shaft which is attached to one member of the movable member and the guided member and extends in the conveyance direction and a plain bearing which is attached to other member different from the one member of the movable member and the guided member and opens in the conveyance direction, and the shaft is fitted into the plain bearing and slides in the conveyance direction with respect to the plain bearing. In such a configuration, it becomes possible to perform both the functions of guiding the movable linear conveyor in the switching direction and suppressing the warp of the movable linear conveyor with a simple and convenient configuration.

The conveyance path switching apparatus may be configured so that the other-side support mechanism has a regulation member provided on the other side of the movable member, displacement of the movable member toward the other side is regulated by the regulation member when the movable member is butted against the regulation member, accompanying displacement of the movable member toward the other side in accordance with displacement of the other end toward the other side due to thermal deformation of the movable linear conveyor, and there is an interval between the other end of the movable linear conveyor and the second fixed linear conveyor in a state where the displacement of the movable member toward the other side is regulated by the regulation member. In such a configuration, when the thermal deformation is large, it is possible to suppress the displacement of the other end of the movable linear conveyor by the regulation member and thereby avoid the contact between the other end of the movable linear conveyor and the second fixed linear conveyor.

The conveyance path switching apparatus may be configured so that the conveyor moving unit has a one-side support mechanism supporting the movable linear conveyor with respect to the first fixed linear conveyor while having an interval between an one end which is an end on the one side of the movable linear conveyor which is positioned at the first position and the first fixed linear conveyor in the conveyance direction, and the one-side support mechanism permits displacement of the one end of the movable linear conveyor toward the one side in the conveyance direction. In such a configuration, provided is the one-side support mechanism which permits the displacement of the one end of the movable linear conveyor toward one side in the conveyance direction, and in other words, the one end of the movable linear conveyor is released. Particularly, this one-side support mechanism supports the movable linear conveyor with respect to the first fixed linear conveyor while having an interval between an one end which is an end on the one side of the movable linear conveyor which is positioned at the first position and the first fixed linear conveyor in the conveyance direction. Thus, by providing the interval between the one end of the movable linear conveyor and the first fixed linear conveyor by the one-side support mechanism supporting the movable linear conveyor with respect to the first fixed linear conveyor, it is possible to reliably form the interval therebetween. Therefore, the displacement of the one end which is released can be absorbed by this interval, and it is thereby possible to avoid contact between the one end of the movable linear conveyor and the first fixed linear conveyor. Thus, it becomes possible to avoid the movable linear conveyor and the fixed linear conveyor adjacent to the movable linear conveyor from coming into contact with each other due to thermal deformation of the movable linear conveyor and thereby suppress occurrence of a warp of the movable linear conveyor.

The conveyance path switching apparatus may be configured so that the one-side support mechanism has a single axis robot mounted on the first fixed linear conveyor, a driven member driven by the single axis robot in the switching direction, and a one-side support part supporting the movable linear conveyor with respect to the driven member, and the one-side support part permits the movable linear conveyor to move toward the one side with respect to the driven member in the conveyance direction and restrains the movable linear conveyor with respect to the driven member in the switching direction. In such a configuration, the movable linear conveyor is supported by the one-side support part with respect to the driven member driven in the switching direction by the single axis robot. Since this one-side support part restrains the movable linear conveyor with respect to the driven member in the switching direction, when the driven member is driven in the switching direction, the movable linear conveyor is moved, accompanying the driven member. Thus, it is possible to appropriately drive movable linear conveyor in the switching direction. Further, since the one-side support part permits the movable linear conveyor to move toward the one side with respect to driven member in the conveyance direction, the movable linear conveyor can be moved toward the one side, accompanying the thermal deformation of the movable linear conveyor, and the displacement of the one end of the movable linear conveyor is not hindered. As a result, it becomes possible to perform both the functions of driving the movable linear conveyor in the switching direction and suppressing the warp of the movable linear conveyor.

The conveyance path switching apparatus may be configured so that the one-side support part is a slide guide provided in the conveyance direction. In such a configuration, it becomes possible to perform both the functions of guiding the movable linear conveyor in the switching direction and suppressing the warp of the movable linear conveyor with a simple and convenient configuration.

The conveyance path switching apparatus may be configured so that the one-side support mechanism has a fixing member fixing the driven member and the movable linear conveyor at a position between the one-side support part and other-side support mechanism in the conveyance direction. In such a configuration, deformation of the movable linear conveyor is dispersed on both sides of a position which is fixed by the fixing member. Therefore, the displacement of both the ends of the movable linear conveyor can be balanced, and it is possible to effectually use each of both intervals between both the ends of the movable linear conveyor and respective fixed linear conveyors provided with respect to both the ends and effectively avoid the contact between the end of the movable linear conveyor and the fixed linear conveyor.

The conveyance path switching apparatus may be configured so that the conveyor moving unit has a one-side support mechanism supporting the movable linear conveyor with respect to the first fixed linear conveyor while having an interval between an one end which is an end on the one side of the movable linear conveyor which is positioned at the first position and the first fixed linear conveyor in the conveyance direction, and the one-side support mechanism restrains the movable linear conveyor in the conveyance direction. In such a configuration, it is possible to reliably avoid the contact between the one end of the movable linear conveyor and the fixed linear conveyor.

The conveyance path switching apparatus may be configured so that the other-side support mechanism has a single axis robot mounted on the second fixed linear conveyor, a driven member driven by the single axis robot in the switching direction, and an other-side support part supporting the movable linear conveyor with respect to the driven member, and the other-side support part permits the movable linear conveyor to move toward the other side with respect to the driven member in the conveyance direction and restrains the movable linear conveyor with respect to the driven member in the switching direction. In such a configuration, the movable linear conveyor is supported by the other-side support part with respect to the driven member driven in the switching direction by the single axis robot. Since this other-side support part restrains the movable linear conveyor with respect to the driven member in the switching direction, when the driven member is driven in the switching direction, the movable linear conveyor is moved, accompanying the driven member. Thus, it is possible to appropriately drive movable linear conveyor in the switching direction. Further, since the other-side support part permits the movable linear conveyor to move toward the other side with respect to the driven member in the conveyance direction, the movable linear conveyor can be moved toward the other side, accompanying the thermal deformation of the movable linear conveyor, and the displacement of the other end of the movable linear conveyor is not hindered. As a result, it becomes possible to perform both the functions of driving the movable linear conveyor in the switching direction and suppressing the warp of the movable linear conveyor.

According to the present disclosure, it becomes possible to avoid the movable linear conveyor and the fixed linear conveyor adjacent to the movable linear conveyor from coming into contact with each other due to thermal deformation of the movable linear conveyor and thereby suppress occurrence of a warp of the movable linear conveyor.

BRIEF DESCRIPTION OF THE DRAWINGS

FIG. 1A is a plan view schematically showing configuration and operation of a conveyance system in accordance with the disclosure;

FIG. 1B is a plan view schematically showing the configuration and operation of the conveyance system in accordance with the disclosure;

FIG. 1D is a plan view schematically showing the configuration and operation of the conveyance system in accordance with the disclosure;

FIG. 1E is a plan view schematically showing the configuration and operation of the conveyance system in accordance with the disclosure;

FIG. 5 is a side elevational view schematically showing a support mechanism for supporting the movable linear conveyor by using a slide guide;

FIG. 6 is a partially enlarged cross-sectional view schematically showing a function of the support mechanism shown in FIG. 5;

FIG. 7 is an elevational view schematically showing a second example of the branch conveyance apparatus included in the substrate conveyance system;

FIG. 8 is an elevational view schematically showing a third example of the branch conveyance apparatus included in the substrate conveyance system;

FIG. 9 is a flowchart showing an exemplary transfer control in the branch conveyance apparatus including two single axis robots;

FIG. 10 is an elevational view schematically showing a fourth example of the branch conveyance apparatus included in the substrate conveyance system;

FIG. 11 is a side elevational view schematically showing an exemplary link mechanism included in the branch conveyance apparatus shown in FIG. 10; and FIG. 12 is an elevational view schematically showing a fifth example of the branch conveyance apparatus included in the substrate conveyance system.

DETAILED DESCRIPTION

Figure 1C:
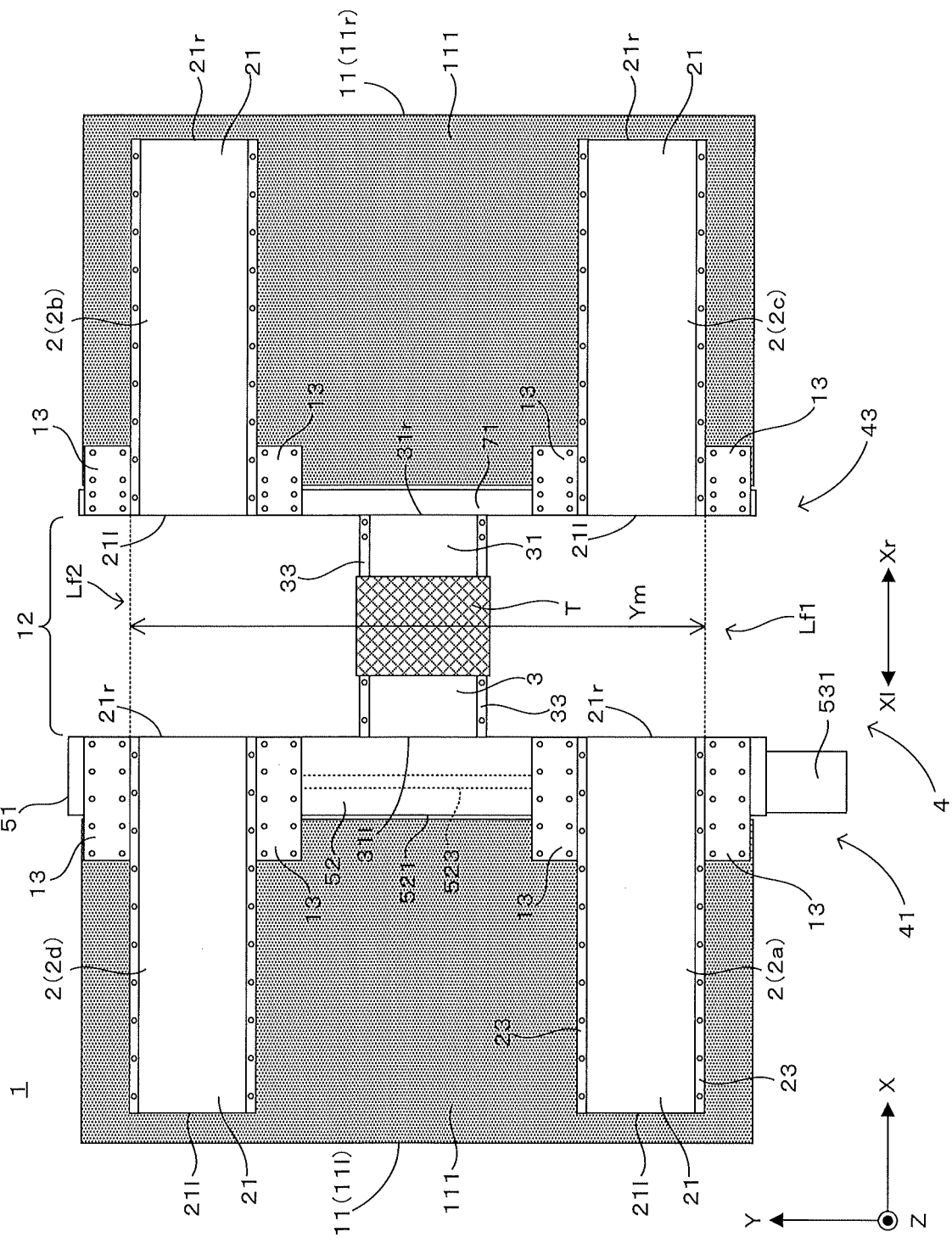
FIG. 1C is a plan view schematically showing the configuration and operation of the conveyance system in accordance with the disclosure.
Figure 2:
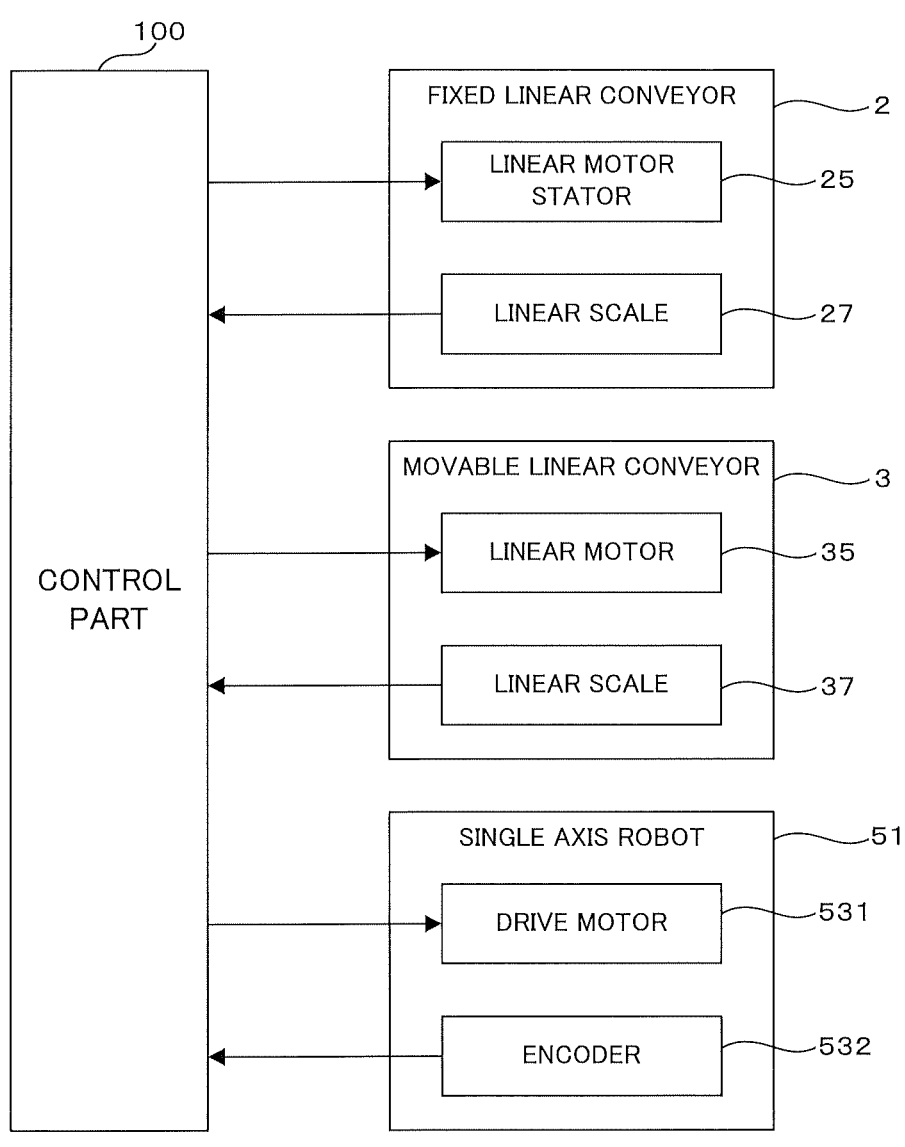
FIG. 2 is a block diagram showing an electrical configuration included in the substrate conveyance system shown in FIGS. 1A to 1E.

FIGS. 1A to 1E are plan views each schematically showing configuration and operation of a conveyance system in accordance with the present disclosure. FIG. 2 is a block diagram showing an electrical configuration included in the substrate conveyance system shown in FIGS. 1A to 1E. In the drawings of the present specification, an X direction which is a horizontal direction, a Y direction which is a horizontal direction orthogonal to the X direction, and a Z direction which is a vertical direction are shown as appropriate, and an X1 side (the left side in the paper of FIGS. 1A to 1E) and an Xr side (the right side in the paper of FIGS. 1A to 1E) which are opposite to each other in the X direction are shown as appropriate.

As shown in FIGS. 1A to 1E, a conveyance system 1 includes two mounting frames 11 and four fixed linear conveyors 2. Further, for distinguishing the two mounting frames 11, the two mounting frames 11 are referred to as mounting frames 111 and 11*r* as appropriate, and for distinguishing the four fixed linear conveyors 2, the four fixed linear conveyors 2 are referred to as fixed linear conveyors 2*a*, 2*b*, 2*c*, and 2*d* as appropriate. Furthermore, in FIG. 2, one fixed linear conveyor 2 is shown on behalf of the four fixed linear conveyors 2.

The two mounting frames 111 and 11*r* are arranged in the X direction with an interval 12 therebetween and each have a rectangle consisting of two sides in parallel with the X direction and two sides in parallel with the Y direction in a plan view. Among the four fixed linear conveyors 2, the two fixed linear conveyors 2*a* and 2*d* are arranged on an upper surface 111 of the mounting frame 111 on the X1 side and the two fixed linear conveyors 2*b* and 2*c* are arranged on an upper surface 111 of the mounting frame 11*r* on the Xr side. Each of the respective upper surfaces 111 of the mounting frames 111 and 11*r* is a horizontal plane orthogonal to the Z direction.

Each of the four fixed linear conveyors 2 is arranged in parallel with the X direction. Particularly, the two fixed linear conveyors 2*a* and 2*d* on the mounting frame 111 are arranged in parallel with each other in the X direction, and the two fixed linear conveyors 2*b* and 2*c* on the mounting frame 11*r* are arranged in parallel with each other in the X direction. Further, the fixed linear conveyor 2*a* on the mounting frame 111 and the fixed linear conveyor 2*c* on the mounting frame 11*r* are arranged in series in the X direction and the fixed linear conveyor 2*d* on the mounting frame 111 and the fixed linear conveyor 2*b* on the mounting frame 11*r* are arranged in series in the X direction. Then, the conveyance system 1 can convey a table conveyor T among these fixed linear conveyors 2*a*, 2*b*, 2*c*, and 2*d*.

The fixed linear conveyor 2 includes a linear housing 21 extending in the X direction, and the linear housing 21 has a rectangle consisting of two sides in parallel with the X direction and two sides in parallel with the Y direction in a plan view. This linear housing 21 has flanges 23 protruding to both sides of the Y direction, and by fastening the flange 23 onto the upper surface 111 of the mounting frame 11 with screws, the fixed linear conveyor 2 is fixed onto the upper surface 111 of the mounting frame 11. Further, an end surface 211 of the linear housing 21 on the X1 side and an end surface 21*r* of the linear housing 21 on the Xr side stand perpendicular to the X direction.

The table conveyor T can engage with or disengage from the linear housing 21 from the X direction. Specifically, the table conveyor T enters the end surface 211 from the X1 side of the linear housing 21 to thereby engage with an upper portion of the linear housing 21 or the table conveyor T enters the end surface 21*r* from the Xr side of the linear housing 21 to thereby engage with the upper portion of the linear housing 21. The table conveyor T thus engaging with the linear housing 21 is guided in the X direction by the linear housing 21. Further, the table conveyor T engaging with the linear housing 21 goes out from the end surface 211 to the X1 side to thereby disengage from the upper portion of the linear housing 21 or the table conveyor T engaging with the linear housing 21 goes out from the end surface 21*r* to the Xr side to thereby disengage from the upper portion of the linear housing 21.

Moreover, the fixed linear conveyor 2 has a linear motor stator 25 arranged inside the linear housing 21 and a linear scale 27 (FIG. 2). The linear motor stator 25 has a coil which generates a magnetic field in accordance with an applied current. In contrast to this, the table conveyor T has a permanent magnet which is a mover and the linear motor stator 25 drives the table conveyor T in the X direction by a magnetic force generated between the linear motor stator 25 and the mover of the table conveyor T engaging with the linear housing 21. Further, the linear scale 27 detects a position (X coordinate) of the table conveyor T in the X direction.

The movable linear conveyor 3 is disposed in the interval 12 between the mounting frame 111 and the mounting frame 11*r* in the X direction in a plan view. The movable linear conveyor 3 includes a linear housing 31 extending in the X direction, and the linear housing 31 has a rectangle consisting of two sides in parallel with the X direction and two sides in parallel with the Y direction in a plan view. This linear housing 31 has flanges 33 protruding to both sides of the Y direction. Further, an end surface 311 of the linear housing 31 on the X1 side and an end surface 31*r* of the linear housing 31 on the Xr side stand perpendicular to the X direction.

The table conveyor T can engage with or disengage from the linear housing 31 from the X direction. Specifically, the table conveyor T enters the end surface 311 from the X1 side of the linear housing 31 to thereby engage with an upper portion of the linear housing 31 or the table conveyor T enters the end surface 31*r* from the Xr side of the linear housing 31 to thereby engage with the upper portion of the linear housing 31. The table conveyor T thus engaging with the linear housing 31 is guided in the X direction by the linear housing 31. Further, the table conveyor T engaging with the linear housing 31 goes out from the end surface 311 to the X1 side to thereby disengage from the upper portion of the linear housing 31 or the table conveyor T engaging with the linear housing 31 goes out from the end surface 31*r* to the Xr side to thereby disengage from the upper portion of the linear housing 31.

Moreover, the movable linear conveyor 3 has a linear motor stator 35 arranged inside the linear housing 31 and a linear scale 37 (FIG. 2). The linear motor stator 35 has a coil which generates a magnetic field in accordance with an applied current. This linear motor stator 35 drives the table conveyor T in the X direction by a magnetic force generated between the linear motor stator 35 and the mover of the table conveyor T engaging with the linear housing 31. Further, the linear scale 37 detects a position (X coordinate) of the table conveyor T in the X direction.

In the interval 12 in which the movable linear conveyor 3 is disposed, a movable range Ym of the movable linear conveyor 3 is provided extending in parallel with the Y direction. The conveyance system 1 includes a conveyor moving unit 4 provided for the movable range Ym, and the conveyor moving unit 4 moves the movable linear conveyor 3 in the Y direction within the movable range Ym. This conveyor moving unit 4 has a support mechanism 41 arranged on the X1 side of the movable range Ym and a support mechanism 43 arranged on the Xr side of the movable range Ym.

The support mechanism 41 has a single axis robot 51 arranged in parallel with the Y direction. The single axis robot 51 has a robot body 52 extending in the Y direction. The robot body 52 has a robot housing 521 extending in the Y direction and a ball screw 523 arranged in parallel with the Y direction inside the robot housing 521. This robot housing 521 is fixed onto the upper surface 111 of the mounting frame 111 via a fixing plate 13. Specifically, the fixing plate 13 is disposed from above, spanning the upper surface 111 of the mounting frame 11 and an upper surface 521*t* of the robot housing 521 of the single axis robot 51 in the X direction. Then, an end portion of the fixing plate 13 on the X1 side is fastened and fixed to the upper surface 111 of the mounting frame 11 with screws (fastening members) and an end portion of the fixing plate 13 on the Xr side is fastened and fixed to the upper surface 521*t* of the robot housing 521 of the single axis robot 51 with screws (fastening members). Particularly, a pair of fixing plates 13 are arranged for each of the fixed linear conveyors 2*a* and 2*d* so that the pair of fixing plates 13 can sandwich the fixed linear conveyor 2 from the Y direction. Further, the robot housing 521 is fixed to each of the fixed linear conveyors 2*a* and 2*d* as described later. Furthermore, the single axis robot 51 has a drive motor 531 attached to one end of the robot body 52 in the Y direction and an encoder 532 (FIG. 2) for detecting a rotation position of the drive motor 531, and the drive motor 531 is connected to the ball screw 523. A nut of the ball screw 523 of the single axis robot 51 is connected to an end portion of the movable linear conveyor 3 on the X1 side, and when the drive motor 531 rotates a screw shaft of the ball screw 523, the movable linear conveyor 3 is moved in the Y direction.

Further, the support mechanism 43 has a Y-axis conveyor guide 71 extending in parallel with the Y direction. The Y-axis conveyor guide 71 is fixed to the upper surface 111 of the mounting frame 11*r* via the fixing plate 13. Specifically, the fixing plate 13 is disposed from above, spanning the upper surface 111 of the mounting frame 11 and an upper surface 722*t* of the Y-axis conveyor guide 71 in the X direction. Then, an end portion of the fixing plate 13 on the Xr side is fastened and fixed to the upper surface 111 of the mounting frame 11 with screws (fastening members) and an end portion of the fixing plate 13 on the X1 side is fastened and fixed to the upper surface 722*t* of the Y-axis conveyor guide 71 with screws (fastening members). Particularly, a pair of fixing plates 13 are arranged for each of the fixed linear conveyors 2*b* and 2*c* so that the pair of fixing plates 13 can sandwich the fixed linear conveyor 2 from the Y direction. Further, the Y-axis conveyor guide 71 is fixed to each of the fixed linear conveyors 2*b* and 2*c* as described later. The Y-axis conveyor guide 71 is connected to the end portion of the movable linear conveyor 3 on the Xr side, and guides the movable linear conveyor 3, which is moving by a driving force of the drive motor 531, in the Y direction.

Further, the conveyance system 1 has a control part 100 (FIG. 2) configured to control the four fixed linear conveyors 2, the movable linear conveyor 3, and the single axis robot 51. The control part 100 is formed from a processor such as a CPU (Central Processing Unit) or an FPGA (Field Programmable Gate Array) or the like. The control part 100 performs a feedback control on each fixed linear conveyor 2, for controlling a position of the table conveyor T by adjusting a current to be applied to the linear motor stator 25 on the basis of the position of the table conveyor T detected by the linear scale 27. Further, the control part 100 performs a feedback control on the movable linear conveyor 3, for controlling a position of the table conveyor T in the X direction by adjusting a current to be applied to the linear motor stator 35 on the basis of the position of the table conveyor T detected by the linear scale 37. Furthermore, the control part 100 performs a feedback control on the single axis robot 51, for controlling a position of the table conveyor T in the Y direction by adjusting a rotation position of the drive motor 531 on the basis of the rotation position of the drive motor 531 detected by the encoder 532, in other words, the position (Y coordinate) of the movable linear conveyor 3 in the Y direction.

In the conveyance system 1, the movable linear conveyor 3 is movable in the Y direction within the movable range Ym and can be positioned at any one of a plurality of facing positions Lf1 and Lf2 included in the movable range Ym. Herein, the facing positions Lf1 and Lf2 are positions different from each other in the Y direction, and the facing position Lf1 faces the fixed linear conveyors 2*a* and 2*c* in the X direction and the facing position Lf2 faces the fixed linear conveyors 2*b* and 2*d* in the X direction. Specifically, the movable linear conveyor 3 positioned at the facing position Lf1 faces an end surface 21*r* of the fixed linear conveyor 2*a* on the Xr side from the Xr side and faces an end surface 211 of the fixed linear conveyor 2*c* on the X1 side from the X1 side. Further, the movable linear conveyor 3 positioned at the facing position Lf2 faces an end surface 21*r* of the fixed linear conveyor 2*d* on the Xr side from the Xr side and faces an end surface 211 of the fixed linear conveyor 2*b* on the X1 side from the X1 side.

Furthermore, the support mechanism 41 supports the movable linear conveyor 3 to the fixed linear conveyor 2*a* so that there is an interval (clearance) between an end surface 311 of the movable linear conveyor 3 positioned at the facing position Lf1 and the end surface 21*r* of the fixed linear conveyor 2*a*. Further, the support mechanism 43 supports the movable linear conveyor 3 to the fixed linear conveyor 2*c* so that there is an interval (clearance) between an end surface 31*r* of the movable linear conveyor 3 positioned at the facing position Lf1 and the end surface 211 of the fixed linear conveyor 2*c*. Similarly, the support mechanism 41 supports the movable linear conveyor 3 to the fixed linear conveyor 2*d* so that there is an interval (clearance) between the end surface 311 of the movable linear conveyor 3 positioned at the facing position Lf2 and the end surface 21r of the fixed linear conveyor 2d. Further, the support mechanism 43 supports the movable linear conveyor 3 to the fixed linear conveyor 2b so that there is an interval (clearance) between the end surface 31r of the movable linear conveyor 3 positioned at the facing position Lf2 and the end surface 21l of the fixed linear conveyor 2b.

Therefore, the control part 100 controls the fixed linear conveyor 2a and the movable linear conveyor 3 while controlling the single axis robot 51 to position the movable linear conveyor 3 at the facing position Lf1, to thereby transfer the table conveyor T between the fixed linear conveyor 2a and the movable linear conveyor 3. Further, the control part 100 controls the fixed linear conveyor 2c and the movable linear conveyor 3 while controlling the single axis robot 51 to position the movable linear conveyor 3 at the facing position Lf1, to thereby transfer the table conveyor T between the fixed linear conveyor 2c and the movable linear conveyor 3.

Alternatively, the control part 100 controls the fixed linear conveyor 2d and the movable linear conveyor 3 while controlling the single axis robot 51 to position the movable linear conveyor 3 at the facing position Lf2, to thereby transfer the table conveyor T between the fixed linear conveyor 2d and the movable linear conveyor 3. Further, the control part 100 controls the fixed linear conveyor 2b and the movable linear conveyor 3 while controlling the single axis robot 51 to position the movable linear conveyor 3 at the facing position Lf2, to thereby transfer the table conveyor T between the fixed linear conveyor 2b and the movable linear conveyor 3.

Herein, the transfer of the table conveyor T between the fixed linear conveyor 2 and the movable linear conveyor 3 includes both the move of the table conveyor T from the fixed linear conveyor 2 to the movable linear conveyor 3 and the move of the table conveyor T from the movable linear conveyor 3 to the fixed linear conveyor 2.

The control part 100 can convey the table conveyor T in various manners, and particularly can perform such branch conveyance as described next. In FIG. 1A, for example, the table conveyor T engages with the fixed linear conveyor 2a. In contrast to this, in the conveyance system 1, the two fixed linear conveyors 2b and 2c are arranged in parallel on the Xr side of the fixed linear conveyor 2a with which the table conveyor T engages. Therefore, for conveying this table conveyor T from the fixed linear conveyor 2a toward the Xr side, each of the fixed linear conveyors 2b and 2c can be used as a conveyance destination. Specifically, a conveyance path is branched to any one of these fixed linear conveyors 2b and 2c to convey the table conveyor T (branch conveyance). Further, such branch conveyance can be performed between the fixed linear conveyor 2b (conveyance source) and the fixed linear conveyor 2a or 2d (conveyance destination), between the fixed linear conveyor 2c (conveyance source) and the fixed linear conveyor 2a or 2d (conveyance destination), or between the fixed linear conveyor 2d (conveyance source) and the fixed linear conveyor 2b or 2c (conveyance destination).

Herein, with reference to FIGS. 1A to 1E, an example of the branch conveyance of the table conveyor T from the fixed linear conveyor 2a to the fixed linear conveyor 2b will be described. In FIG. 1A, the movable linear conveyor 3 is stopped at the facing position Lf1 facing the fixed linear conveyor 2a with which the table conveyor T engages. In FIGS. 1A to 1B, the table conveyor T is transferred from the fixed linear conveyor 2a to the movable linear conveyor 3. After the transfer of the table conveyor T to the movable linear conveyor 3 is completed, the movable linear conveyor 3 is moved from the facing position Lf1 toward the facing position Lf2 in the Y direction (FIG. 1C). When the movable linear conveyor 3 reaches the facing position Lf2 facing the fixed linear conveyor 2b, the movable linear conveyor 3 is stopped at the facing position Lf2 (FIG. 1D). Then, in FIGS. 1D to 1E, the table conveyor T is transferred from the movable linear conveyor 3 to the fixed linear conveyor 2b.

Figure 3:
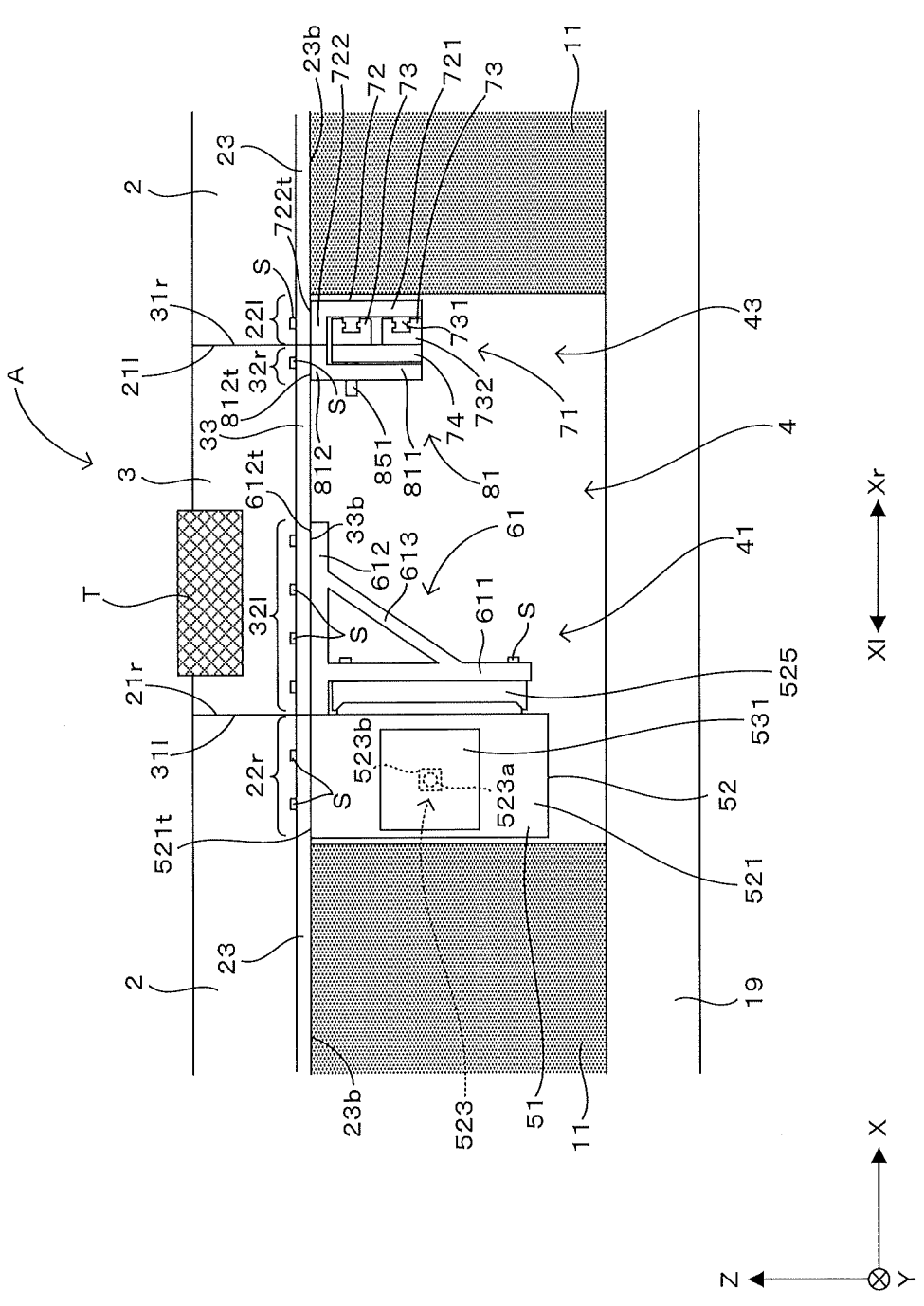
FIG. 3 is an elevational view schematically showing a first example of a branch conveyance apparatus included in the substrate conveyance system.

FIG. 3 is an elevational view schematically showing a first example of the branch conveyance apparatus included in the substrate conveyance system. This branch conveyance apparatus A includes the above-described movable linear conveyor 3 and the conveyor moving unit 4. FIG. 3 shows a base plate 19 to be placed on an installation surface of the conveyance system 1, the mounting frame 11 placed on the base plate 19, the fixed linear conveyor 2 mounted on the mounting frame 11, and the branch conveyance apparatus A. The conveyor moving unit 4 of the branch conveyance apparatus A has the support mechanism 41 and the support mechanism 43 as described above. Among these, the support mechanism 41 uses the single axis robot 51 to move the movable linear conveyor 3 in the Y direction, and the support mechanism 43 uses the Y-axis conveyor guide 71 to guide the movable linear conveyor 3 in the Y direction.

Figure 4:
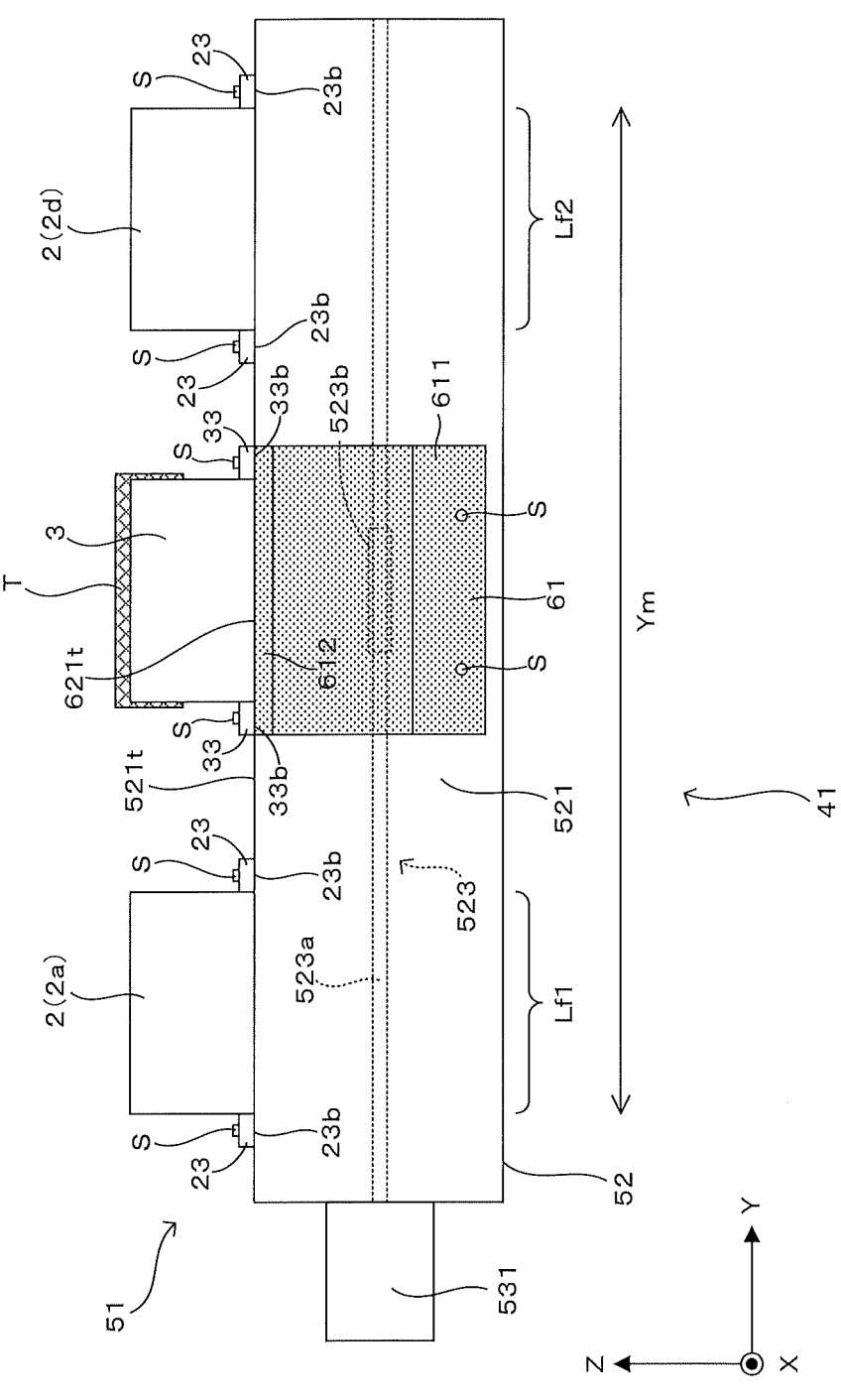
FIG. 4 is a side elevational view schematically showing a support mechanism for supporting a movable linear conveyor by using a single axis robot.

FIG. 4 is a side elevational view schematically showing the support mechanism for supporting the movable linear conveyor by the single axis robot. The support mechanism 41 shown in FIG. 4 has the single axis robot 51 arranged in parallel with the Y direction, and the single axis robot 51 has the robot body 52 extending in the Y direction and the drive motor 531 attached to one end of the robot body 52 in the Y direction. This robot body 52 has the robot housing 521, the ball screw 523 to be housed inside the robot housing 521, and a slider 525 (FIG. 3) arranged on the Xr side of the robot housing 521. The ball screw 523 has a screw shaft 523a extending in parallel with the Y direction and a nut 523b to be screwed together with the screw shaft 523a, and the drive motor 531 is connected to the screw shaft 523a and the slider 525 is connected to the nut 523b with a connecting member (not shown). Therefore, when the drive motor 531 rotates the screw shaft 523a, the nut 523b is moved in the Y direction and the slider 525 is moved in the Y direction, accompanying the nut 523b. Thus, the single axis robot 51 transmits a driving force of the drive motor 531 to the slider 525 with the ball screw 523, to thereby add the driving force of the drive motor 531 to the slider 525 while guiding the slider 525 in the Y direction which is an extending direction of the ball screw 523. The slider 525 is thereby moved in the Y direction.

The upper surface 521t of the robot housing 521 is butted against a bottom surface 23b of the flange 23 of the fixed linear conveyor 2 from below, and by bringing the upper surface 521t and the bottom surface 23b into contact with each other, the robot housing 521 is positioned with respect to the fixed linear conveyor 2. Particularly, as shown in FIG. 3, the end portion 22r on the Xr side of the fixed linear conveyor 2 on the X1 side protrudes to the Xr side from the mounting frame 11 on which the fixed linear conveyor 2 is mounted. In contrast to this, the robot housing 521 of the single axis robot 51 faces the end portion 22r of the fixed linear conveyor 2 from below and overlaps the end portion 22r in a plan view. Then, at the end portion 22r of the fixed linear conveyor 2, the flange 23 of the fixed linear conveyor 2 and the upper surface 521t of the robot housing 521 are fastened and fixed to each other with screws S (fastening members).

Further, as shown in FIG. 4, in the Y direction, the robot housing 521 of the single axis robot 51 is longer than the movable range Ym so as to include the movable range Ym, and the two fixed linear conveyors 2a and 2d are positioned between both the ends of the robot housing 521. Then, the upper surface 521t of the robot housing 521 is fastened and fixed to the flange 23 of each of the two fixed linear conveyors 2a and 2d with screws S.

Further, the support mechanism 41 has a conveyor support member 61 arranged on the Xr side of the slider 525. The conveyor support member 61 has a standing plate 611 standing in the Z direction so as to be orthogonal to the X direction, a horizontal plate 612 provided horizontally on an upper end of the standing plate 611, and a brace 613 provided between the standing plate 611 and the horizontal plate 612. The standing plate 611 comes into contact with the slider 525 from the Xr side and is fastened and fixed to the slider 525 with screws S.

An upper surface 612t of the horizontal plate 612 is butted against a bottom surface 33b of the flange 33 of the movable linear conveyor 3 from below, and by bringing the upper surface 612t and the bottom surface 33b into contact with each other, the conveyor support member 61 is positioned with respect to the movable linear conveyor 3. Then, the flange 33 of the movable linear conveyor 3 and the upper surface 612t of the horizontal plate 612 of the conveyor support member 61 are fastened and fixed to each other with screws S (fastening members).

Thus, the single axis robot 51 mounted on the fixed linear conveyor 2 supports the conveyor support member 61 mounted on the movable linear conveyor 3 in the Z direction. In other words, the support mechanism 41 having the single axis robot 51 and the conveyor support member 61 performs a function of supporting the movable linear conveyor 3 to the fixed linear conveyor 2.

Further, the single axis robot 51 mounted on the fixed linear conveyor 2 drives and guides the conveyor support member 61 mounted on the movable linear conveyor 3 in the Y direction. In other words, the support mechanism 41 having the single axis robot 51 and the conveyor support member 61 performs of functions of driving the movable linear conveyor 3 with respect to the fixed linear conveyor 2 in the Y direction and guiding the move of the movable linear conveyor 3 with respect to the fixed linear conveyor 2 in the Y direction.

FIG. 5 is a side elevational view schematically showing a support mechanism for supporting the movable linear conveyor by a slide guide, and FIG. 6 is a partially enlarged cross-sectional view schematically showing a function of the support mechanism shown in FIG. 5. The support mechanism 43 shown in FIG. 5 and FIG. 6 has the Y-axis conveyor guide 71, and the Y-axis conveyor guide 71 has a base frame 72 extending in the Y direction, two slide guides 73 extending in the Y direction, and a support slider 74 attached to these slide guides 73.

The base frame 72 has a standing plate 721 standing in the Z direction so as to be orthogonal to the X direction and a horizontal plate 722 provided horizontally on an upper end of the standing plate 721, and each slide guide 73 is fixed to a side surface of the standing plate 721 on the X1 side. Each slide guide 73 has a Y-axis guide rail 731 extending in parallel with the Y direction, and the Y-axis guide rail 731 is fixed to the horizontal plate 722 of the base frame 72. Further, each slide guide 73 has a slider 732 to be engaged with the Y-axis guide rail 731, and the slider 732 is moved in the Y direction along the Y-axis guide rail 731. The support slider 74 is a flat plate standing so as to be orthogonal to the X direction and fixed to a side surface on the X1 side of the slider 732 of each of the two slide guides 73. The support slider 74 is moved in the Y direction along the two Y-axis guide rails 731.

An upper surface 722t of the horizontal plate 722 is butted against the bottom surface 23b of the flange 23 of the fixed linear conveyor 2 from below, and by bringing the upper surface 722t and the bottom surface 23b into contact with each other, the Y-axis conveyor guide 71 is positioned with respect to the fixed linear conveyor 2. Particularly, as shown in FIG. 3, the end portion 221 on the X1 side of the fixed linear conveyor 2 on the Xr side protrudes to the X1 side from the mounting frame 11 on which the fixed linear conveyor 2 is mounted. In contrast to this, the base frame 72 of the Y-axis conveyor guide 71 faces the end portion 221 of the fixed linear conveyor 2 from below and overlaps the end portion 221 in a plan view. Then, at the end portion 221 of the fixed linear conveyor 2, the flange 23 of the fixed linear conveyor 2 and the upper surface 722t of the horizontal plate 722 are fastened and fixed to each other with screws S (fastening members).

Further, as shown in FIG. 5, in the Y direction, the Y-axis guide rail 731 is longer than the movable range Ym so as to include the movable range Ym and the base frame 72 supporting the Y-axis guide rail 731 is also longer than the movable range Ym so as to include the movable range Ym. In contrast to this, the two fixed linear conveyors 2b and 2c are positioned between both the ends of the base frame 72. Then, the upper surface 722t of the horizontal plate 722 of the base frame 72 is fastened and fixed to the flange 23 of each of the two fixed linear conveyors 2b and 2c with screws S.

Furthermore, the support mechanism 43 has a conveyor support member 81 arranged on the X1 side of the support slider 74. The conveyor support member 81 has a standing plate 811 standing in the Z direction so as to be orthogonal to the X direction and a horizontal plate 812 provided horizontally on an upper end of the standing plate 811. The standing plate 811 faces the support slider 74 from the X1 side, and a hole 813 is provided in the standing plate 811, passing through in the X direction.

Particularly, the support mechanism 43 has an engaging support part 85 which supports the conveyor support member 81 by the support slider 74. The engaging support part 85 has a shaft 851 protruding from the support slider 74 toward the X1 side in parallel with the X direction and a plain bearing 852 fitted in the hole 813 of the conveyor support member 81. The plain bearing 852 has an opening 853 passing through in the X direction, and the shaft 851 is inserted into the opening 853. In other words, the plain bearing 852 receives the shaft 851 inserted in the opening 853. Thus, the conveyor support member 81 is engaged with the shaft 851 protruding from the support slider 74 via the plain bearing 852. This plain bearing 852 permits the shaft 851 to move in the X direction with respect to the plain bearing 852 and restrains the shaft 851 in the Y direction and the Z direction with respect to the plain bearing 852.

In other words, the shaft 851 permits the conveyor support member 81 to move in the X direction. Therefore, the conveyor support member 81 is movable in the X direction with respect to the Y-axis conveyor guide 71. Further, the shaft 851 restrains the conveyor support member 81 in the Y direction. Therefore, the conveyor support member 81 is guided in the Y direction by the support slider 74 moving along the Y-axis guide rail 731. Furthermore, the shaft 851 restrains the conveyor support member 81 in the Z direction.

Therefore, the conveyor support member 81 is supported by the Y-axis conveyor guide 71 against the gravity in the Z direction.

Further, in this example, the support slider 74 is provided with the shaft 851 and the standing plate 811 is provided with the plain bearing 852. The same function can be achieved if the support slider 74 is provided with the plain bearing 852 and the standing plate 811 is provided with the shaft 851.

An upper surface 812t of the horizontal plate 812 of the conveyor support member 81 is butted against the bottom surface 33b of the flange 33 of the movable linear conveyor 3 from below, and by bringing the upper surface 812t and the bottom surface 33b into contact with each other, the conveyor support member 81 is positioned with respect to the movable linear conveyor 3. Then, the flange 33 of the movable linear conveyor 3 and the upper surface 812t of the horizontal plate 812 of the conveyor support member 81 are fastened and fixed to each other with screws S (fastening members).

Thus, the Y-axis conveyor guide 71 mounted on the fixed linear conveyor 2 supports the conveyor support member 81 mounted on the movable linear conveyor 3 in the Z direction. In other words, the support mechanism 43 having the Y-axis conveyor guide 71 and the conveyor support member 81 performs a function of supporting the movable linear conveyor 3 with respect to the fixed linear conveyor 2.

Further, the Y-axis conveyor guide 71 mounted on the fixed linear conveyor 2 guides the conveyor support member 81 mounted on the movable linear conveyor 3 in the Y direction. In other words, the support mechanism 43 having the Y-axis conveyor guide 71 and the conveyor support member 81 performs of a function of guiding the move of the movable linear conveyor 3 with respect to the fixed linear conveyor 2 in the Y direction.

Thus, the branch conveyance apparatus A includes the support mechanism 41 that supports an end portion 321 of the movable linear conveyor 3 on the X1 side with respect to the end portion 22r of the fixed linear conveyor 2 on the Xr side and the support mechanism 43 that supports an end portion 32r of the movable linear conveyor 3 on the Xr side with respect to the end portion 221 of the fixed linear conveyor 2 on the X1 side. With reference to FIGS. 4 and 5, an operation of the branch conveyance apparatus A in the Y direction will be described. As shown in FIG. 4, when the drive motor 531 drives the screw shaft 523a of the ball screw 523, the conveyor support member 61 fixed to the slider 525 (FIG. 3) is moved in the Y direction and the movable linear conveyor 3 fixed to the conveyor support member 61 is moved in the Y direction. Further, as shown in FIG. 5, the move of the movable linear conveyor 3 is guided in the Y direction by the Y-axis guide rail 731 of the Y-axis conveyor guide 71. Thus, the movable linear conveyor 3 is driven and guided in the Y direction by the single axis robot 51 and is guided in the Y direction by the Y-axis guide rail 731, to be thereby moved in the Y direction within the movable range Ym including the facing position Lf1 and the facing position Lf2.

Further, as shown in FIG. 6, the support mechanism 43 on the Xr side of the branch conveyance apparatus A performs a function of absorbing elongation of the movable linear conveyor 3 in the X direction, accompanying heat generation. Specifically, the support mechanism 43 supports the movable linear conveyor 3 to the fixed linear conveyor 2 while having an interval Da between the end surface 211 of the fixed linear conveyor 2 and the end surface 31r of the movable linear conveyor 3. Further, the Y-axis conveyor guide 71 mounted on the fixed linear conveyor 2 and the conveyor support member 81 mounted on the movable linear conveyor 3 are separated from each other, corresponding to the interval Da, in the X direction. Therefore, the interval Da is provided in the X direction between the horizontal plate 722 and the horizontal plate 812 which face each other in the X direction, and an interval Db is provided in the X direction between the support slider 74 and the standing plate 811 which face each other in the X direction.

For example, when the linear housing 31 of the movable linear conveyor 3 is elongated in the X direction due to the heat released from the linear motor stator 25 by the current applied to the linear motor stator 25, the end surface 31r of the movable linear conveyor 3 is displaced toward the Xr side in the X direction. Further, accompanying the elongation of the movable linear conveyor 3, the conveyor support member 81 is also displaced toward the Xr side in the X direction. As can be seen from a comparison between the fields of "permissive state" and "regulation state" in FIG. 6, accompanying the thermal deformation of the movable linear conveyor 3, the intervals Da and Db become narrower. In other words, since the thermal deformation of the movable linear conveyor 3 is absorbed by the interval Da, the contact between the movable linear conveyor 3 and the fixed linear conveyor 2 is avoided.

Further, the support mechanism 43 has a regulation plate 87 arranged between the Y-axis conveyor guide 71 and the conveyor support member 81 in the X direction. The regulation plate 87 has a ring shape and is fitted around the shaft 851 from the outer side. Specifically, the regulation plate 87 is engaged with the shaft 851, to be thereby supported by the shaft 851. This regulation plate 87 may be fixed to the support slider 74 or the standing plate 811 or may be not. Further, when the regulation plate 87 is fixed to either of the support slider 74 and the standing plate 811, the regulation plate 87 does not need to be engaged with the shaft 851 and does not need to have a ring shape.

This regulation plate 87 is disposed in the interval Db between the support slider 74 and the standing plate 811 and has a predetermined thickness in the X direction. Therefore, when the displacement of the end surface 31r of the movable linear conveyor 3 toward the Xr side becomes larger and the standing plate 811 gets closer to the support slider 74, the standing plate 811 comes into contact with the regulation plate 87 from the X1 side and the support slider 74 comes into contact with the regulation plate 87 from the Xr side. In other words, the standing plate 811 is butted from the X1 side against the regulation plate 87 supported by the support slider 74 from the Xr side. As shown in the field of "regulation state" in FIG. 6, the displacement of the conveyor support member 81 toward the Xr side is thereby regulated. In this regulation state, the interval Da is ensured between the end surface 31r of the movable linear conveyor 3 and the end surface 211 of the fixed linear conveyor 2. In other words, the regulation plate 87 regulates the displacement by the predetermined amount or more of the end surface 31r of the movable linear conveyor 3 toward the Xr side, to thereby avoid the contact between the end surface 31r of the movable linear conveyor 3 and the end surface 211 of the fixed linear conveyor 2.

In the first example described above, provided is the support mechanism 43 (other-side support mechanism) which permits the displacement of the end surface 31r (other end) of the movable linear conveyor 3 toward the Xr side (other side) in the X direction (conveyance direction), and in other words, the end surface 31r of the movable linear conveyor 3 is released. Particularly, this support mechanism 43 supports the end portion 32$r$ of the movable linear conveyor 3 with respect to the end portion 211 of the fixed linear conveyor 2 while having the interval Da between the end surface 31$r$ of the movable linear conveyor 3 positioned at the facing position L1 (first position) or the facing position Lf2 (second position) and the end surface 211 of the fixed linear conveyor 2 in the X direction. Thus, since the interval Da is provided between the end surface 31$r$ of the movable linear conveyor 3 and the end surface 211 of the fixed linear conveyor 2 by the support mechanism 43 supporting the movable linear conveyor 3 with respect to the fixed linear conveyor 2, it is possible to reliably form the interval Da therebetween. Therefore, it is possible to absorb the displacement of the released end surface 31$r$ by the interval Da and thereby avoid the contact between the end surface 31$r$ of the movable linear conveyor 3 and the end surface 211 of the fixed linear conveyor 2. Thus, it becomes possible to avoid the movable linear conveyor 3 and the fixed linear conveyor 2 adjacent to the movable linear conveyor 3 from coming into contact with each other due to the thermal deformation of the movable linear conveyor 3 and thereby suppress occurrence of the warp of the movable linear conveyor 3.

Further, the support mechanism 43 has the conveyor support member 81 (movable member) mounted on the movable linear conveyor 3, the slide guide 73 (guide part) mounted on the fixed linear conveyor 2, and the support slider 74 (guided member) to be guided in the Y direction (switching direction) by the slide guide 73. Further, the support mechanism 43 has the engaging support part 85 (other-side support part) supporting the conveyor support member 81 with respect to the support slider 74. Then, the engaging support part 85 permits the conveyor support member 81 to move toward the Xr side with respect to the support slider 74 in the X direction and restrains the conveyor support member 81 with respect to the support slider 74 in the Y direction. In such a configuration, the conveyor support member 81 is mounted on the movable linear conveyor 3 and is supported by the engaging support part 85 with respect to the support slider 74 guided in the Y direction. Since this engaging support part 85 restrains the conveyor support member 81 with respect to the support slider 74 in the Y direction, when the support slider 74 is guided in the Y direction, the conveyor support member 81 is moved, accompanying the support slider 74, and further the movable linear conveyor 3 is moved, accompanying the conveyor support member 81. Thus, the movable linear conveyor 3 can be appropriately guided in the Y direction. Further, since the engaging support part 85 permits the conveyor support member 81 to move toward the Xr side with respect to the support slider 74 in the X direction, the conveyor support member 81 can be moved toward the Xr side, accompanying the thermal deformation of the movable linear conveyor 3, and the displacement of the end surface 31$r$ of the movable linear conveyor 3 is not hindered. As a result, it becomes possible to perform both the functions of guiding the movable linear conveyor 3 in the Y direction and suppressing the warp of the movable linear conveyor 3.

Further, the engaging support part 85 has the shaft 851 that is attached to one of the conveyor support member 81 and the support slider 74 and extends in the X direction and the plain bearing 852 that is attached to the other member different from the one of the conveyor support member 81 and the support slider 74 and opens in the X direction. Then, the shaft 851 is fitted into the plain bearing 852 and slides in the X direction with respect to the plain bearing 852. In such a configuration, it becomes possible to perform both the functions of guiding the movable linear conveyor 3 in the Y direction and suppressing the warp of the movable linear conveyor 3 with a simple and convenient configuration.

Further, the support mechanism 43 has the regulation plate 87 (regulation member) provided on the Xr side of the conveyor support member 81. Then, in accordance with the displacement of the end surface 31$r$ toward the Xr side due to the thermal deformation of the movable linear conveyor 3, the conveyor support member 81 is butted against the regulation plate 87, accompanying the displacement of the conveyor support member 81 toward the Xr side, to thereby regulate the displacement of the conveyor support member 81 toward the Xr side by the regulation plate 87. Thus, in a state where the displacement of the conveyor support member 81 toward the Xr side is regulated by the regulation plate 87, the interval Da is provided between the end surface 31$r$ of the movable linear conveyor 3 and the end surface 211 of the fixed linear conveyor 2. In such a configuration, when the thermal deformation is large, the displacement of the end surface 31$r$ of the movable linear conveyor 3 is suppressed by the regulation plate 87, and the contact between the end surface 31$r$ of the movable linear conveyor 3 and the end surface 211 of the fixed linear conveyor 2 can be avoided.

Further, the support mechanism 41 of the conveyor moving unit 4 supports the movable linear conveyor 3 with respect to the fixed linear conveyor 2 while having the interval between the end surface 311 on the X1 side (one side) of the movable linear conveyor 3 positioned at the facing position Lf1 (first position) or the facing position Lf2 (second position) and the end surface 21$r$ of the fixed linear conveyor 2 in the X direction. Unlike the support mechanism 43, this support mechanism 41 restrains the movable linear conveyor 3 in the X direction. In such a configuration, since the displacement of the end surface 311 of the movable linear conveyor 3 toward the X1 side is suppressed by the restraint of the support mechanism 41, it is possible to reliably avoid the contact between the end surface 311 of the movable linear conveyor 3 and the end surface 21$r$ of the fixed linear conveyor 2.

The interval between the end surface 311 of the movable linear conveyor 3 and the end surface 21$r$ of the fixed linear conveyor 2, which is ensured by the support mechanism 41, does not need to absorb the thermal elongation of the movable linear conveyor 3 but has only to avoid the interference between the end surface 311 and end surface 21$r$. Therefore, the interval may be a clearance narrower than the interval Da shown in FIG. 6.

FIG. 7 is an elevational view schematically showing a second example of the branch conveyance apparatus included in the substrate conveyance system. Herein, description will be made, centering on the difference between the second example and the first example shown in FIG. 3, and common constituent elements are represented by corresponding reference signs and description thereof will be omitted as appropriate. In this second example, the support mechanism 41 supports the end portion 321 of the movable linear conveyor 3 with respect to the end portion 22$r$ of the fixed linear conveyor 2 (2$a$, 2$d$) so that an interval Dc for absorbing thermal deformation, which corresponds to the interval Da shown in FIG. 6, can be provided between the end surface 311 of the movable linear conveyor 3 and the end surface 21$r$ of the fixed linear conveyor 2 (2$a$, 2$d$). Further, the interval Da and the interval Dc do not need to have the same width but may have different widths.

Particularly, the support mechanism 41 has a slide support part 63 which supports the movable linear conveyor 3 with respect to the conveyor support member 61 so as to be movable in the X direction. The slide support part 63 is a slide guide having a guide rail 631 in parallel with the X direction and a slider 632 to be engaged with the guide rail 631, and the slider 632 is movable in the X direction along the guide rail 631. The guide rail 631 is fixed to the upper surface 612*t* of the horizontal plate 612. The slider 632 is butted against the bottom surface 33*b* of the flange 33 of the movable linear conveyor 3 from below, to be fastened and fixed to the flange 33 with screws S. Thus, the end portion 321 of the movable linear conveyor 3 on the X1 side is supported by the slide support part 63 so as to be movable in the X direction with respect to the conveyor support member 61. Therefore, when thermal elongation of the movable linear conveyor 3 occurs, the end surface 311 of the movable linear conveyor 3 can be displaced toward the X1 side within a range of the interval Dc.

Further, the support mechanism 41 has a screw Sa (fastening member) fastening and fixing the flange 33 of the movable linear conveyor 3 to the conveyor support member 61 between the slide support part 63 and the conveyor support member 81 in the X direction. In such a configuration, the thermal elongation of the movable linear conveyor 3 in the X direction occurs, being dispersed on both sides of the screw Sa. The support mechanism 43 permits the displacement of the end surface 31*r* of the movable linear conveyor 3 toward the Xr side within a range of the interval Da, to thereby absorb the thermal elongation occurring on the Xr side with respect to the screw Sa. Furthermore, the support mechanism 41 permits the displacement of the end surface 311 of the movable linear conveyor 3 toward the X1 side within a range of the interval Dc, to thereby absorb the thermal elongation occurring on the X1 side with respect to the screw Sa.

In the second example described above, provided is the support mechanism 41 which permits the displacement of the end surface 311 of the movable linear conveyor 3 toward the X1 side in the X direction, and in other words, the end surface 311 of the movable linear conveyor 3 is released. Particularly, this support mechanism 41 supports the end portion 321 of the movable linear conveyor 3 with respect to the end portion 22*r* of the fixed linear conveyor 2 while having the interval Dc between the end surface 311 of the movable linear conveyor 3 positioned at the facing position L1 or the facing position Lf2 and the end surface 21*r* of the fixed linear conveyor 2 in the X direction. Thus, since the interval Dc is provided between the end surface 311 of the movable linear conveyor 3 and the end surface 21*r* of the fixed linear conveyor 2 by the support mechanism 41 supporting the movable linear conveyor 3 with respect to the fixed linear conveyor 2, it is possible to reliably form the interval Dc therebetween. Therefore, it is possible to absorb the displacement of the released end surface 311 by the interval Dc and thereby avoid the contact between the end surface 311 of the movable linear conveyor 3 and the end surface 21*r* of the fixed linear conveyor 2. Thus, it becomes possible to avoid the movable linear conveyor 3 and the fixed linear conveyor 2 adjacent to the movable linear conveyor 3 from coming into contact with each other due to the thermal deformation of the movable linear conveyor 3 and thereby suppress occurrence of the warp of the movable linear conveyor 3.

Further, the support mechanism 41 has the single axis robot 51 mounted on the fixed linear conveyor 2 and the conveyor support member 61 to be driven by the single axis robot 51 in the Y direction. Furthermore, the support mechanism 41 has the slide support part 63 (one-side support part) supporting the movable linear conveyor 3 with respect to the conveyor support member 61. This slide support part 63 permits the end portion 321 of the movable linear conveyor 3 to move toward the X1 side with respect to the conveyor support member 61 in the X direction and restrains the end portion 321 of the movable linear conveyor 3 with respect to the conveyor support member 61 in the Y direction. Thus, the movable linear conveyor 3 is supported by the slide support part 63 with respect to the conveyor support member 61 driven by the single axis robot 51 in the Y direction. Since this slide support part 63 restrains the movable linear conveyor 3 with respect to the conveyor support member 61 in the Y direction, when the conveyor support member 61 is driven in the Y direction, the movable linear conveyor 3 is moved, accompanying the conveyor support member 61. Thus, it is possible to appropriately drive the movable linear conveyor 3 in the Y direction. Further, since the slide support part 63 permits the end portion 321 of the movable linear conveyor 3 to move toward the X1 side with respect to the conveyor support member 61 in the X direction, the end portion 321 of the movable linear conveyor 3 can be moved toward X1 side, accompanying the thermal deformation of the movable linear conveyor 3, and the displacement of the end surface 311 of the movable linear conveyor 3 is not hindered. As a result, it becomes possible to perform both the functions of driving the movable linear conveyor 3 in the Y direction and suppressing the warp of the movable linear conveyor 3.

Further, the slide support part 63 is a slide guide provided in the X direction. In such a configuration, it is possible to perform both the functions of guiding the movable linear conveyor 3 in the Y direction and suppressing the warp of the movable linear conveyor 3 with a simple and convenient configuration, i.e., the slide guide.

Furthermore, the support mechanism 41 has the screw Sa (fixing member) fixing the conveyor support member 61 and the movable linear conveyor 3 at positions between the slide support part 63 and the support mechanism 43 in the X direction. In such a configuration, the deformation of the movable linear conveyor 3 is dispersed on both the sides of the position which is fixed by the screw Sa. Therefore, the displacement of both the end surfaces 31*r* and 311 of the movable linear conveyor 3 can be balanced, and it is possible to effectually use each of both the intervals Da and Dc between the end surfaces 31*r* and 311 and the respective fixed linear conveyors 2 provided with respect to the end surfaces 31*r* and 311 and effectively avoid the respective contacts between the end surfaces 31*r* and 311 of the movable linear conveyor 3 and the end surfaces 211 and 21*r* of the fixed linear conveyors.

FIG. 8 is an elevational view schematically showing a third example of the branch conveyance apparatus included in the substrate conveyance system. Herein, description will be made, centering on the difference between the third example and the second example shown in FIG. 7, and common constituent elements are represented by corresponding reference signs and description thereof will be omitted as appropriate. In this third example, the support mechanism 43 has the single axis robot 51 instead of the Y-axis conveyor guide 71 (in the second example) and the conveyor support member 61 and the slide support part 63 instead of the conveyor support member 81 (in the second example). In other words, the support mechanism 43 has the configuration common to those of the support mechanism 41 except fixing by the screw Sa.

In the support mechanism 43, the upper surface 521*t* of the single axis robot 51 comes into contact with the bottom surface 23*b* of the end portion 221 of the fixed linear conveyor 2 from below. Then, at the end portion 221, the upper surface 521*t* of the single axis robot 51 is fastened and fixed to the flange 23 of the fixed linear conveyor 2 with the screws S. Further, in the support mechanism 43, the conveyor support member 61 is fixed to the slider 525 of the single axis robot 51, and this conveyor support member 61 supports the end portion 32*r* of the movable linear conveyor 3 via the slide support part 63. Thus, the end portion 32*r* of the movable linear conveyor 3 on the Xr side is supported by the slide support part 63 to be movable in the X direction with respect to the conveyor support member 61. Therefore, when thermal elongation of the movable linear conveyor 3 occurs, the end surface 31*r* of the movable linear conveyor 3 can be displaced toward the Xr side within a range of the interval Da.

As shown in the third example of FIG. 8, in the branch conveyance apparatus A in which the single axis robots 51 are provided on both the sides of the movable linear conveyor 3, the control part 100 may control the drive motor 531 of each of the single axis robots 51 as follows.

FIG. 9 is a flowchart showing an exemplary transfer control in the branch conveyance apparatus including the two single axis robots. The flowchart of this figure is executed by the control of the control part 100 when the table conveyor T is transferred between the fixed linear conveyor 2 and the movable linear conveyor 3.

In Step S101, it is determined whether to perform the transfer of the table conveyor T. Then, when it is determined that the table conveyor T should be transferred ("YES" in Step S101), the process goes to Step S102. In Step S102, it is determined whether the fixed linear conveyor 2 to be used for transferring the table conveyor T to/from the movable linear conveyor 3 is the fixed linear conveyor 2*a* or 2*d* on the X1 side of the movable linear conveyor 3 or the fixed linear conveyor 2*b* or 2*c* on the Xr side of the movable linear conveyor 3.

When the target fixed linear conveyor 2 is the fixed linear conveyor on the X1 side, the control part 100 performs the above-described feedback control on the drive motor 531 of the support mechanism 41 on the X1 side, to thereby position the table conveyor T at the facing position Lf1 or the facing position Lf2 while stopping the operation of the drive motor 531 of the support mechanism 43 on the Xr side (Step S103). At that time, since the drive motor 531 of the support mechanism 43 is stopped (servo free), the single axis robot 51 of the support mechanism 43 does not perform the function of driving the movable linear conveyor 3 but performs only the function of guiding the movable linear conveyor 3 in the Y direction. Thus, when the movable linear conveyor 3 is positioned at the facing position Lf1 or the facing position Lf2, the table conveyor T is transferred between the movable linear conveyor 3 and fixed linear conveyor 2 on the X1 side of the movable linear conveyor 3 (Step S104).

When the target fixed linear conveyor 2 is the fixed linear conveyor on the Xr side, the control part 100 performs the above-described feedback control on the drive motor 531 of the support mechanism 43 on the Xr side, to thereby position the table conveyor T at the facing position Lf1 or the facing position Lf2 while stopping the operation of the drive motor 531 of the support mechanism 41 on the X1 side (Step S105). At that time, since the drive motor 531 of the support mechanism 41 is stopped (servo free), the single axis robot 51 of the support mechanism 41 does not perform the function of driving the movable linear conveyor 3 but performs only the function of guiding the movable linear conveyor 3 in the Y direction. Thus, when the movable linear conveyor 3 is positioned at the facing position Lf1 or the facing position Lf2, the table conveyor T is transferred between the movable linear conveyor 3 and fixed linear conveyor 2 on the Xr side of the movable linear conveyor 3 (Step S106).

In the transfer control shown in FIG. 9, the control part 100 controls an operation of the drive motor 531 (first/second drive source) of each of the support mechanisms 41 and 43. Particularly, when transferring the table conveyor T between the movable linear conveyor 3 and the fixed linear conveyor 2*a* or 2*d* on the X1 side, the control part 100 controls the position of the movable linear conveyor 3 at the facing position Lf1 or Lf2 by the operation of the drive motor 531 of the support mechanism 41 on the X1 side while stopping the operation of the drive motor 531 of the support mechanism 43 on the Xr side (Step S103). Further, when transferring the table conveyor T between the movable linear conveyor 3 and the fixed linear conveyor 2*b* or 2*c* on the Xr side, the control part 100 controls the position of the movable linear conveyor 3 at the facing position Lf1 or Lf2 by the operation of the drive motor 531 of the support mechanism 43 on the Xr side while stopping the operation of the drive motor 531 of the support mechanism 41 on the X1 side (Step S105). In such a configuration, when transferring the table conveyor T between the movable linear conveyor 3 and the fixed linear conveyor 2*a* or 2*d*, it is possible to accurately position the movable linear conveyor 3 with respect to the fixed linear conveyor 2*a* or 2*d* by the drive motor 531 of the support mechanism 41 while preventing interference of the operation of the drive motor 531 of the support mechanism 43, thereby smoothly transferring the table conveyor T. Further, when transferring the table conveyor T between the movable linear conveyor 3 and the fixed linear conveyor 2*b* or 2*c*, it is possible to accurately position the movable linear conveyor 3 with respect to either of the fixed linear conveyors 2*b* and 2*c* by the drive motor 531 of the support mechanism 43 while preventing interference of the operation of the drive motor 531 of the support mechanism 41, thereby smoothly transferring the table conveyor T.

FIG. 10 is an elevational view schematically showing a fourth example of the branch conveyance apparatus included in the substrate conveyance system, and FIG. 11 is a side elevational view schematically showing an exemplary link mechanism included in the branch conveyance apparatus shown in FIG. 10. Herein, description will be made, centering on the difference between the fourth example and the first example shown in FIG. 3, and common constituent elements are represented by corresponding reference signs and description thereof will be omitted as appropriate. In this fourth example, the support mechanism 41 has the Y-axis conveyor guide 71 instead of the single axis robot 51 (in the first example) and the conveyor support member 81 instead of the conveyor support member 61 (in the first example). In other words, the support mechanism 41 has the configuration common to those of the support mechanism 43.

In the support mechanism 41, the upper surface 722*t* of the Y-axis conveyor guide 71 comes into contact with the bottom surface 23*b* of the end portion 22*r* of the fixed linear conveyor 2 from below. Then, at the end portion 22*r*, the upper surface 722*t* of the Y-axis conveyor guide 71 is fastened and fixed to the flange 23 of the fixed linear conveyor 2 with screws S. Further, in the support mechanism 41, the conveyor support member 81 is fixed to the slider 732 of the Y-axis conveyor guide 71, and the upper surface 812*t* of the conveyor support member 81 comes into contact with the bottom surface 33*b* of the end portion 321 of the movable linear conveyor 3 from below and is fastened and fixed to the flange 33 of the movable linear conveyor 3 at the end portion 321. Therefore, the support mechanism 41 can support the end portion 321 of the movable linear conveyor 3 with respect to the end portion 22r of the fixed linear conveyor 2 and can also guide the end portion 321 of the movable linear conveyor 3 in the Y direction.

Further, in the conveyor moving unit 4 shown in FIG. 10, on a support frame 18 placed on the base plate 19, the single axis robot 51 is disposed in the Y direction. Then, the single axis robot 51 and the movable linear conveyor 3 are connected to each other with a link mechanism 9. As shown in FIG. 11, the link mechanism 9 has a mounting plate 91 and a spherical bearing 92 fixed to an upper surface of the mounting plate 91. Furthermore, the link mechanism 9 also has a mounting plate 94 provided above the mounting plate 91 and a spherical bearing 95 fixed to a lower surface of the mounting plate 94.

Moreover, the link mechanism 9 has a rod 97 with which the spherical bearing 92 and the spherical bearing 95 are connected to each other, and one end 971 of this rod 97 is received by the spherical bearing 95 and the other end 972 of the rod 97 opposite to the one end 971 is received by the spherical bearing 92. This rod 97 has two rotational degrees of freedom with respect to the spherical bearing 92 and two rotational degrees of freedom with respect to the spherical bearing 95. In other words, the rod 97 can rotate with respect to the spherical bearing 92 and can also rotate with respect to the spherical bearing 95 about two rotation axes orthogonal to each other, respectively.

Then, the mounting plate 91 is fastened and fixed to an upper surface of the slider 525 of the single axis robot 51 with screws S. Further, the mounting plate 94 is fastened and fixed to the bottom surface 33b of the flange 33 of the movable linear conveyor 3 with screws S. This mounting plate 94 is fixed to the movable linear conveyor 3 at a center position between the end portion 321 and the end portion 32r of the movable linear conveyor 3 in the X direction. Therefore, when the drive motor 531 drives the ball screw 523 to drive the slider 525 in the Y direction, the movable linear conveyor 3 connected to the slider 525 with the link mechanism 9 is moved in the Y direction.

Thus, in the fourth example, provided are the link mechanism 9 mounted on the movable linear conveyor 3 at the mounting position (position of the mounting plate 94) between the end portion 321 and the end portion 32r of the movable linear conveyor 3 and the single axis robot 51 driving the link mechanism 9 in the Y direction to thereby move the movable linear conveyor 3 in the Y direction. The link mechanism 9 has the spherical bearing 95 (first spherical bearing) mounted on the movable linear conveyor 3 via the mounting plate 94, the spherical bearing 92 (second spherical bearing) mounted on the slider 525 of the single axis robot 51 via the mounting plate 91, and the rod 97 with which the spherical bearing 95 and the spherical bearing 92 are connected to each other. Then, the one end 971 of the rod 97 is received by the spherical bearing 95 and the other end 972 of the rod 97 is received by the spherical bearing 92. In such a configuration, it is possible to absorb an error in the degree of parallelism between the Y-axis conveyor guide 71 of each of the support mechanisms 41 and 43 and the single axis robot 51 by the degrees of freedom of the spherical bearings 92 and 95. Therefore, it is possible to smoothly move the movable linear conveyor 3 in the Y direction.

FIG. 12 is an elevational view schematically showing a fifth example of the branch conveyance apparatus included in the substrate conveyance system. Herein, description will be made, centering on the difference between the fifth example and the third example shown in FIG. 8, and common constituent elements are represented by corresponding reference signs and description thereof will be omitted as appropriate. In this fifth example, in the support mechanism 41, the Y-axis conveyor guide 71, instead of the single axis robot 51 (in the third example), is attached to the end portion 221 of the fixed linear conveyor 2 and the conveyor support member 81, instead of the conveyor support member 61, is attached to the end portion 32r of the movable linear conveyor 3. In other words, the support mechanism 41 of the fifth example includes the configuration common to those of the support mechanism 43 in the first example (FIG. 3). In the support mechanism 41 of the fifth example, however, the engaging support part 85 is not provided and the standing plate 811 is fixed to the support slider 74. Therefore, the support mechanism 41 restrains the end portion 32r of the movable linear conveyor 3 in the X direction. Therefore, the thermal elongation of the movable linear conveyor 3 cannot be absorbed by the support mechanism 41 but is absorbed by the interval Da in the support mechanism 43.

Thus, in the fifth example, the support mechanism 43 (other-side support mechanism) has the single axis robot 51 mounted on the fixed linear conveyor 2 (second fixed linear conveyor), the conveyor support member 61 (driven member) driven by the single axis robot 51 in the Y direction (switching direction), and the slide support part 63 (other-side support part) supporting the movable linear conveyor 3 with respect to the conveyor support member 61. This slide support part 63 permits the end portion 32r of the movable linear conveyor 3 to move toward the Xr side (other side) with respect to the conveyor support member 61 in the X direction (conveyance direction) and restrains the end portion 32r of the movable linear conveyor 3 with respect to the conveyor support member 61 in the Y direction. In other words, the movable linear conveyor 3 is supported by the slide support part 63 with respect to the conveyor support member 61 driven by the single axis robot 51 in the Y direction. Since this slide support part 63 restrains the movable linear conveyor 3 with respect to the conveyor support member 61 in the Y direction, when the conveyor support member 61 is driven in the Y direction, the movable linear conveyor 3 is moved, accompanying the conveyor support member 61. Thus, it is possible to appropriately drive the movable linear conveyor 3 in the Y direction. Further, since the slide support part 63 permits the movable linear conveyor 3 to move toward the Xr side with respect to the conveyor support member 61 in the X direction, the end portion 32r of the movable linear conveyor 3 can be moved toward Xr side, accompanying the thermal deformation of the movable linear conveyor 3, and the displacement of the end surface 31r of the movable linear conveyor 3 is not hindered. As a result, it becomes possible to perform both the functions of driving the movable linear conveyor 3 in the Y direction and suppressing the warp of the movable linear conveyor 3.

Thus, in the above-described embodiment, the conveyance system 1 corresponds to one example of a "conveyance path switching apparatus" of the present disclosure, the fixed linear conveyor 2a corresponds to one example of a "first fixed linear conveyor" of the present disclosure, the fixed linear conveyor 2b corresponds to one example of a "second fixed linear conveyor" of the present disclosure, the movable linear conveyor 3 corresponds to one example of a "movable linear conveyor" of the present disclosure, the end surface 311 corresponds to one example of the "other end" of the present disclosure, the conveyor moving unit 4 corresponds to one example of a "conveyor moving unit" of the present disclosure, the support mechanism 41 corresponds to one example of a "one-side support mechanism" of the present disclosure, the support mechanism 43 corresponds to one example of the "other-side support mechanism" of the present disclosure, the single axis robot 51 corresponds to one example of a "single axis robot" of the present disclosure, the conveyor support member 61 corresponds to one example of a "driven member" of the present disclosure, the slide support part 63 corresponds to one example of a "one-side support part" or the "other-side support part" of the present disclosure, the branch conveyance apparatus A corresponds to one example of a "conveyance path switching apparatus" of the present disclosure, the interval Da corresponds to one example of an "interval" of the present disclosure, the facing position Lf1 corresponds to one example of a "first position" of the present disclosure, the facing position Lf2 corresponds to one example of a "second position" of the present disclosure, the screw Sa corresponds to one example of a "fixing member" of the present disclosure, the table conveyor T corresponds to one example of a "conveyor table" of the present disclosure, the X direction corresponds to one example of a "conveyance direction" of the present disclosure, the X1 side corresponds to one example of "one side" of the present disclosure, the Xr side corresponds to one example of "the other side" of the present disclosure, and the Y direction corresponds to one example of a "switching direction" of the present disclosure.

In the first example (FIG. 3), the second example (FIG. 7), and FIG. 10 (the fourth example), the conveyor support member 81 corresponds to one example of a "movable member" of the present disclosure, the slide guide 73 corresponds to one example of a "guide part" of the present disclosure, the support slider 74 corresponds to one example of a "guided member" of the present disclosure, the engaging support part 85 corresponds to one example of the "other-side support part" of the present disclosure, the shaft 851 corresponds to one example of a "shaft" of the present disclosure, the plain bearing 852 corresponds to one example of a "plain bearing" of the present disclosure, and the regulation plate 87 corresponds to one example of a "regulation member" of the present disclosure.

Further, the present disclosure is not limited to the above-described embodiment, and numerous modifications and variations can be added to those described above without departing from the scope of the disclosure. For example, a mechanism which permits the displacement of the end surface 311 or the end surface 31r facing the clearance for absorbing thermal deformation between the fixed linear conveyor 2 and the movable linear conveyor 3 is not limited to the above-described engaging support part 85 (the shaft 851 and the plain bearing 852) or the slide support part 63 (slide guide) but may be, for example, an LM stroke or the like.

Furthermore, the above-described branch conveyance apparatus A does not necessarily need the base plate 19. Therefore, the branch conveyance apparatus A may be directly placed on the installation surface without using the base plate 19.

Further, the number of and the arrangement of fixed linear conveyors 2 used in the conveyance system 1 can be changed as appropriate. From the example shown in FIGS. 1A to 1E, for example, modifications such as shifting the position of the fixed linear conveyor 2c in the Y direction, shifting the position of the fixed linear conveyor 2d in the Y direction, omitting the fixed linear conveyor 2c, omitting the fixed linear conveyor 2d, or the like can be made.

Further, various changes can be made on the direction (switching direction) in which the movable linear conveyor 3 is driven. Therefore, the direction in which the movable linear conveyor 3 is driven is not limited to the horizontal direction but may be the vertical direction. In this case, the branch conveyance apparatus A can branch the conveyance path of the table conveyor T in the vertical direction.

What is claimed is:

1. A conveyance path switching apparatus, comprising:
a movable linear conveyor configured to convey a conveyor table in a predetermined conveyance direction; and
a conveyor moving unit configured to move the movable linear conveyor between a first position and a second position which are different from each other in a switching direction inclined with respect to the conveyance direction,
wherein a first fixed linear conveyor faces the first position from one side of the conveyance direction,
a second fixed linear conveyor faces the second position from other side of the conveyance direction opposite to the one side,
the movable linear conveyor is configured to transfer the conveyor table to/from the first fixed linear conveyor while stopping at the first position,
the movable linear conveyor is configured to transfer the conveyor table to/from the second fixed linear conveyor while stopping at the second position,
the conveyor moving unit has an other-side support mechanism which supports the movable linear conveyor with respect to the second fixed linear conveyor while having an interval between the other end which is an end on the other side of the movable linear conveyor which is positioned at the second position and the second fixed linear conveyor in the conveyance direction, and
the other-side support mechanism permits displacement of the other end of the movable linear conveyor toward the other side in the conveyance direction.

2. The conveyance path switching apparatus according to claim 1, wherein
the other-side support mechanism has a movable member attached to the movable linear conveyor, a guide part attached to the second fixed linear conveyor, a guided member configured to be guided in the switching direction by the guide part, and an other-side support part supporting the movable member with respect to the guided member, and
the other-side support part permits the movable member to move toward the other side with respect to the guided member in the conveyance direction and restrains the movable member with respect to the guided member in the switching direction.

3. The conveyance path switching apparatus according to claim 2, wherein
the other-side support part has a shaft which is attached to one member of the movable member and the guided member and extends in the conveyance direction and a plain bearing which is attached to other member different from the one member of the movable member and the guided member and is configured to open in the conveyance direction, and
the shaft is fitted into the plain bearing and slides in the conveyance direction with respect to the plain bearing.

4. The conveyance path switching apparatus according to claim 2, wherein the other-side support mechanism has a regulation member on the other side of the movable member, displacement of the movable member toward the other side is regulated by the regulation member when the movable member is butted against the regulation member, accompanying displacement of the movable member toward the other side in accordance with displacement of the other end toward the other side due to thermal deformation of the movable linear conveyor, and there is an interval between the other end of the movable linear conveyor and the second fixed linear conveyor in a state where the displacement of the movable member toward the other side is regulated by the regulation member.

5. The conveyance path switching apparatus according to claim 1, wherein the conveyor moving unit has a one-side support mechanism supporting the movable linear conveyor with respect to the first fixed linear conveyor while having an interval between an one end which is an end on the one side of the movable linear conveyor which is positioned at the first position and the first fixed linear conveyor in the conveyance direction, and the one-side support mechanism permits displacement of the one end of the movable linear conveyor toward the one side in the conveyance direction.

6. The conveyance path switching apparatus according to claim 5, wherein the one-side support mechanism has a single axis robot mounted on the first fixed linear conveyor, a driven member driven by the single axis robot in the switching direction, and a one-side support part supporting the movable linear conveyor with respect to the driven member, and the one-side support part permits the movable linear conveyor to move toward the one side with respect to the driven member in the conveyance direction and restrains the movable linear conveyor with respect to the driven member in the switching direction.

7. The conveyance path switching apparatus according to claim 6, wherein the one-side support part is a slide guide provided in the conveyance direction.

8. The conveyance path switching apparatus according to claim 6, wherein the one-side support mechanism has a fixing member configured to fix the driven member and the movable linear conveyor at a position between the one-side support part and other-side support mechanism in the conveyance direction.

9. The conveyance path switching apparatus according to claim 1, wherein the conveyor moving unit has a one-side support mechanism supporting the movable linear conveyor with respect to the first fixed linear conveyor while having an interval between an one end which is an end on the one side of the movable linear conveyor which is positioned at the first position and the first fixed linear conveyor in the conveyance direction, and the one-side support mechanism is configured to restrain the movable linear conveyor in the conveyance direction.

10. The conveyance path switching apparatus according to claim 1, wherein the other-side support mechanism has a single axis robot mounted on the second fixed linear conveyor, a driven member configured to be driven by the single axis robot in the switching direction, and an other-side support part supporting the movable linear conveyor with respect to the driven member, and the other-side support part permits the movable linear conveyor to move toward the other side with respect to the driven member in the conveyance direction and restrains the movable linear conveyor with respect to the driven member in the switching direction.

11. A conveyance system, comprising:

a first fixed linear conveyor configured to drive a conveyor table in a conveyance direction;

a second fixed linear conveyor configured to drive the conveyor table in the conveyance direction; and a conveyance path switching apparatus according to claim 1 which is between the first fixed linear conveyor and the second fixed linear conveyor in the conveyance direction.

12. A conveyance path switching method, comprising:

moving a movable linear conveyor configured to convey a conveyor table in a predetermined conveyance direction, between a first position and a second position which are different from each other in a switching direction inclined with respect to the conveyance direction, by a conveyor moving unit, wherein a first fixed linear conveyor faces the first position from one side of the conveyance direction, a second fixed linear conveyor faces the second position from the other side of the conveyance direction opposite to the one side, the movable linear conveyor is configured to transfer the conveyor table to/from the first fixed linear conveyor while stopping at the first position, the movable linear conveyor is configured to transfer the conveyor table to and from the second fixed linear conveyor while stopping at the second position, the conveyor moving unit has an other-side support mechanism supporting the movable linear conveyor with respect to the second fixed linear conveyor while having an interval between the other end which is an end on the other side of the movable linear conveyor which is positioned at the second position and the second fixed linear conveyor in the conveyance direction, and the other-side support mechanism permits displacement of the other end of the movable linear conveyor toward the other side in the conveyance direction.

13. The conveyance path switching apparatus according to claim 3, wherein the other-side support mechanism has a regulation member on the other side of the movable member, displacement of the movable member toward the other side is regulated by the regulation member when the movable member is butted against the regulation member, accompanying displacement of the movable member toward the other side in accordance with displacement of the other end toward the other side due to thermal deformation of the movable linear conveyor, and there is an interval between the other end of the movable linear conveyor and the second fixed linear conveyor in a state where the displacement of the movable member toward the other side is regulated by the regulation member.

14. The conveyance path switching apparatus according to claim 2, wherein the conveyor moving unit has a one-side support mechanism supporting the movable linear conveyor with respect to the first fixed linear conveyor while having an interval between an one end which is an end on the one side of the movable linear conveyor which is positioned at the first position and the first fixed linear conveyor in the conveyance direction, and the one-side support mechanism permits displacement of the one end of the movable linear conveyor toward the one side in the conveyance direction.

15. The conveyance path switching apparatus according to claim 3, wherein the conveyor moving unit has a one-side support mechanism supporting the movable linear conveyor with respect to the first fixed linear conveyor while having an interval between an one end which is an end on the one side of the movable linear conveyor which is positioned at the first position and the first fixed linear conveyor in the conveyance direction, and the one-side support mechanism permits displacement of the one end of the movable linear conveyor toward the one side in the conveyance direction.

16. The conveyance path switching apparatus according to claim 7, wherein the one-side support mechanism has a fixing member configured to fix the driven member and the movable linear conveyor at a position between the one-side support part and other-side support mechanism in the conveyance direction.

17. The conveyance path switching apparatus according to claim 2, wherein the conveyor moving unit has a one-side support mechanism supporting the movable linear conveyor with respect to the first fixed linear conveyor while having an interval between an one end which is an end on the one side of the movable linear conveyor which is positioned at the first position and the first fixed linear conveyor in the conveyance direction, and the one-side support mechanism is configured to restrain the movable linear conveyor in the conveyance direction.

18. The conveyance path switching apparatus according to claim 3, wherein the conveyor moving unit has a one-side support mechanism supporting the movable linear conveyor with respect to the first fixed linear conveyor while having an interval between an one end which is an end on the one side of the movable linear conveyor which is positioned at the first position and the first fixed linear conveyor in the conveyance direction, and the one-side support mechanism is configured to restrain the movable linear conveyor in the conveyance direction.

19. A conveyance system, comprising:

a first fixed linear conveyor configured to drive a conveyor table in a conveyance direction;

a second fixed linear conveyor configured to drive the conveyor table in the conveyance direction; and a conveyance path switching apparatus according to claim 2 which is between the first fixed linear conveyor and the second fixed linear conveyor in the conveyance direction.

20. A conveyance system, comprising:

a first fixed linear conveyor configured to drive a conveyor table in a conveyance direction;

a second fixed linear conveyor configured to drive the conveyor table in the conveyance direction; and a conveyance path switching apparatus according to claim 3 which is between the first fixed linear conveyor and the second fixed linear conveyor in the conveyance direction.

* * * * *